US011119712B2

(12) United States Patent
Ren

(10) Patent No.: US 11,119,712 B2
(45) Date of Patent: Sep. 14, 2021

(54) IMAGE PROCESSING APPARATUS EXECUTING IMAGE PROCESS IN ACCORDANCE WITH SETTING INCLUDING SETTING VALUE SPECIFIED FOR EACH SETTING CATEGORY

(71) Applicant: BROTHER KOGYO KABUSHIKI KAISHA, Aichi (JP)

(72) Inventor: Yongyong Ren, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/419,207

(22) Filed: May 22, 2019

(65) Prior Publication Data
US 2019/0361650 A1 Nov. 28, 2019

(30) Foreign Application Priority Data
May 23, 2018 (JP) .............................. JP2018-098834

(51) Int. Cl.
*G06F 3/12* (2006.01)
*H04N 1/00* (2006.01)
*H04N 1/44* (2006.01)

(52) U.S. Cl.
CPC .......... *G06F 3/1239* (2013.01); *G06F 3/1204* (2013.01); *G06F 3/1255* (2013.01); *H04N 1/00509* (2013.01); *H04N 1/4433* (2013.01); *G06F 3/1288* (2013.01)

(58) Field of Classification Search
CPC ............ H04N 1/2376; H04N 1/00509; H04N 1/4433; G06F 3/1255; G06F 3/1204; G06F 3/1288; G06F 3/1239
See application file for complete search history.

(56) References Cited

U.S. PATENT DOCUMENTS

| 2006/0026434 A1* | 2/2006 | Yoshida | H04N 1/00244 713/182 |
| 2007/0206216 A1* | 9/2007 | Sakagami | H04N 1/4433 358/1.15 |

(Continued)

FOREIGN PATENT DOCUMENTS

| JP | 2012190337 A | 10/2012 |
| JP | 2014056320 A | 3/2014 |

*Primary Examiner* — Nicholas Pachol
(74) *Attorney, Agent, or Firm* — Scully, Scott, Murphy & Presser, P C.

(57) ABSTRACT

In an image processing apparatus, a controller determines using setting specification information whether all of a plurality of users is permitted to use all of a plurality of setting values for a setting category in response to receiving a registration instruction. The setting specification information specifies for each user at least one setting value that is permitted to use for an image process by the user. In response to determining that any of the plurality of users is not permitted to use all of the setting values for the setting category, the controller transmits to the server a registration request not including the plurality of setting values for the setting category. The controller controls, in response to receiving a function execution instruction from the server, an image processing unit to execute the image process in accordance with a setting including a setting value for the setting category.

10 Claims, 17 Drawing Sheets

(56) References Cited

U.S. PATENT DOCUMENTS

| | | | |
|---|---|---|---|
| 2011/0134456 A1* | 6/2011 | Tsujimoto | H04N 1/00464 358/1.13 |
| 2012/0293819 A1* | 11/2012 | Doui | H04L 63/083 358/1.13 |
| 2013/0125234 A1* | 5/2013 | Nishiyama | H04N 1/4413 726/21 |
| 2013/0163038 A1* | 6/2013 | Oishi | G06F 3/1288 358/1.15 |
| 2013/0215446 A1* | 8/2013 | Imai | H04N 1/4433 358/1.13 |
| 2014/0071476 A1 | 3/2014 | Aritomi | |
| 2016/0028923 A1* | 1/2016 | Yasuhara | H04N 1/00413 358/1.14 |
| 2016/0246551 A1* | 8/2016 | Ichikawa | G06F 3/1288 |
| 2018/0011667 A1* | 1/2018 | Chang | H04N 1/00411 |
| 2018/0024795 A1* | 1/2018 | Miyata | G06F 3/1261 358/1.15 |
| 2018/0046420 A1* | 2/2018 | Sako | G06F 3/1288 |
| 2019/0047307 A1* | 2/2019 | Ren | G06F 3/1288 |
| 2019/0050170 A1* | 2/2019 | Ren | G06F 3/1203 |
| 2019/0288962 A1* | 9/2019 | Miyata | G06F 3/1257 |
| 2019/0303059 A1* | 10/2019 | Yamada | G06F 3/1204 |

\* cited by examiner

FIG. 1B (FIRST STATE)

| LOGIN STATUS INFORMATION | USERNAME | PASSWORD | ACCOUNT INFORMATION | LIMITATION INFORMATION ||
|---|---|---|---|---|---|
| | | | | COLOR SETTING | PRINTING-SIDES SETTING |
| LOGGED IN | UN1 | P1 | user1@zzz.com | COLOR, MONOCHROME | SIMPLEX, DUPLEX |
| LOGGED OUT | UN2 | P2 | user2@zzz.com | COLOR, MONOCHROME | SIMPLEX, DUPLEX |

38

OR
LIMITATION FLAG = OFF

FIG. 1C (SECOND STATE)

| LOGIN STATUS INFORMATION | USERNAME | PASSWORD | ACCOUNT INFORMATION | LIMITATION INFORMATION ||
|---|---|---|---|---|---|
| | | | | COLOR SETTING | PRINTING-SIDES SETTING |
| LOGGED OUT | UN1 | P1 | user1@zzz.com | COLOR, MONOCHROME | SIMPLEX, DUPLEX |
| LOGGED OUT | UN2 | P2 | user2@zzz.com | MONOCHROME | SIMPLEX, DUPLEX |

38

AND
LIMITATION FLAG = ON (SERVER PRINTING PROCESS: CASE B)

IMAGE PROCESSING APPARATUS EXECUTING IMAGE PROCESS IN ACCORDANCE WITH SETTING INCLUDING SETTING VALUE SPECIFIED FOR EACH SETTING CATEGORY

CROSS REFERENCE TO RELATED APPLICATION

This application claims priority from Japanese Patent Application No. 2018-098834 filed May 23, 2018. The entire content of the priority application is incorporated herein by reference.

TECHNICAL FIELD

The present disclosure relates to a technique in which an image processing apparatus performs an image process by using a server.

BACKGROUND

A conventional printer transmits to a storage management server login information for a specific user, the printer name for the printer, and capability information in order to store this information on the server. The capability information specifies all printing conditions that the printer is capable of implementing. When a personal computer logs in to the storage management server, the server transmits data representing a print settings screen to the personal computer in order that the user of the personal computer can select one printing condition from among the printing conditions specified in the capability information. Subsequently, the storage management server receives print data and condition data specifying the printing condition selected in the print settings screen from the personal computer and transmits this information to the printer, directing the printer to execute a printing operation.

SUMMARY

However, in some cases certain users from among a plurality of users of the printer may only be allowed to select some of the printing conditions that the printer can execute (such as monochrome printing from among monochrome printing and color printing), for example. Here, the data transmitted to the personal computer represents a print settings screen based on capability information representing all printing conditions that the printer can execute. Consequently, the certain users may be able to select printing conditions in the print settings screen that they are not permitted to use, resulting in the printer executing printing operations based on those printing conditions.

In view of the foregoing, it is an object of the present disclosure to provide a technique for suppressing an image processing apparatus that is shared by a plurality of users from executing an image process in response to a command from certain users when the settings specified for the image process include values that the certain users are not permitted to use.

In order to attain the above and other objects, the present disclosure provides an image processing apparatus including: an image processing unit; and a controller. The controller is configured to perform: (a) receiving; (b) determining; (c1) transmitting; (d1) receiving; (e1) controlling; (c2) transmitting; (d2) receiving; and (e2) controlling. The (a) receiving receives a registration instruction for registering information on the image processing apparatus to an external server. The (b) determining determines, in response to receiving the registration instruction, whether all of a plurality of users is permitted to use all of a plurality of setting values for each of at least one setting category. The at least one setting category is used for an image process and includes a first setting category. The first setting category has an M1 number of setting values. M1 is an integer greater than or equal to two. A memory is configured to store setting specification information for each of the plurality of users. The setting specification information specifies, for each of the at least one setting category, at least one setting value among the plurality of setting values that is permitted to use for the image process by the each of the plurality of users. The (b) determining is made using the setting specification information. The (c1) transmitting transmits, in response to determining in (b) that all of the plurality of users is permitted to use all of the M1 number of setting values for the first setting category, to the external server a first registration request. The first registration request includes the M1 number of setting values. The external server is configured to store the M1 number of setting values in association with specific account information corresponding to a specific user in response to receiving the first registration request from the image processing apparatus. The external server is configured to transmit first specification screen data to a terminal device in response to receiving the specific account information from the terminal device. The first specification screen data is generated on the basis of the M1 number of setting values included in the first registration request so that the first specification screen data represents a first specification screen. The first specification screen includes an operation specification area and a first setting specification area. The operation specification area is for receiving an instructing operation to instruct the image processing apparatus to execute the image process. The first setting specification area is for receiving a first specifying operation to specify one of the M1 number of setting values for the first setting category. The (d1) receiving receives a first function execution instruction from the external server. The first function execution instruction includes first information. The terminal device is configured to transmit to the external server a first function execution request including a first setting value for the first setting category in response to receiving the first specifying operation to specify the first setting value from among the M1 number of setting values and the instructing operation while displaying the first specification screen. The first information is related to the first setting value being specified for the first setting category. The first function execution instruction is received after the first function execution request is transmitted from the terminal device to the external server. The (e1) controlling controls, in response to determining in (b) that any of the plurality of users is not permitted to use all of the M1 number of setting values for the first setting category, to the external server a second registration request. The second registration request does not include the M1 number of setting values. The external server is configured to store incapability information in association with the specific account information in response to receiving the second registration request from the image processing apparatus. The incapability information indicates that at least one of the M1 number of setting values is not permitted to be specified. The external server is configured to transmit second specification screen data to the terminal device in response to receiving the specific account information from the terminal device. The second specification screen data is generated on the basis of the incapability information so that the second specification screen data represents a second specification screen. The second specification screen includes the operation specification area and excludes the first setting specification area. The (d2) receiving receives a second function execution instruction from the external server. The terminal device is configured to transmit to the external server a second function execution request in response to receiving the instruction operation while displaying the second specification screen. The second function execution request does not include the M1 number of setting values for the first setting category. The second function execution instruction is received after the second function execution request is transmitted from the terminal device to the external server. The (e2) controlling controls, in response to receiving the second function execution instruction, the image processing unit to execute the image process in accordance with a second setting including a second setting value for the first setting category.

According to another aspect, the present disclosure also provides a non-transitory computer readable storage medium storing a set of program instructions for an image processing apparatus. The image processing apparatus includes an image processing unit. The set of program instructions includes: (a) receiving; (b) determining; (c1) transmitting; (d1) receiving; (e1) controlling; (c2) transmitting; (d2) receiving; and (e2) controlling. The (a) receiving receives a registration instruction for registering information on the image processing apparatus to an external server. The (b) determining determines, in response to receiving the registration instruction, whether all of a plurality of users is permitted to use all of a plurality of setting values for each of at least one setting category. The at least one setting category is used for an image process and includes a first setting category. The first setting category has an M1 number of setting values. M1 is an integer greater than or equal to two. A memory is configured to store setting specification information for each of the plurality of users. The setting specification information specifies, for each of the at least one setting category, at least one setting value among the plurality of setting values that is permitted to use for the image process by the each of the plurality of users. The (b) determining is made using the setting specification information. The (c1) transmitting transmits, in response to determining in (b) that all of the plurality of users is permitted to use all of the M1 number of setting values for the first setting category, to the external server a first registration request. The first registration request includes the M1 number of setting values. The external server is configured to store the M1 number of setting values in association with specific account information corresponding to a specific user in response to receiving the first registration request from the image processing apparatus. The external server is configured to transmit first specification screen data to a terminal device in response to receiving the specific account information from the terminal device. The first specification screen data is generated on the basis of the M1 number of setting values included in the first registration request so that the first specification screen data represents a first specification screen. The first specification screen includes an operation specification area and a first setting specification area. The operation specification area is for receiving an instructing operation to instruct the image processing apparatus to execute the image process. The first setting specification area is for receiving a first specifying operation to specify one of the M1 number of setting values for the first setting category. The (d1) receiving receives a first function execution instruction from the external server. The first function execution instruction includes first information. The terminal device is configured to transmit to the external server a first function execution request including a first setting value for the first setting category in response to receiving the first specifying operation to specify the first setting value from among the M1 number of setting values and the instructing operation while displaying the first specification screen. The first information is related to the first setting value being specified for the first setting category. The first function execution instruction is received after the first function execution request is transmitted from the terminal device to the external server. The (e1) controlling controls, in response to determining in (b) that any of the plurality of users is not permitted to use all of the M1 number of setting values for the first setting category, to the external server a second registration request. The second registration request does not include the M1 number of setting values. The external server is configured to store incapability information in association with the specific account information in response to receiving the second registration request from the image processing apparatus. The incapability information indicates that at least one of the M1 number of setting values is not permitted to be specified. The external server is configured to transmit second specification screen data to the terminal device in response to receiving the specific account information from the terminal device. The second specification screen data is generated on the basis of the incapability information so that the second specification screen data represents a second specification screen. The second specification screen includes the operation specification area and excludes the first setting specification area. The (d2) receiving receives a second function execution instruction from the external server. The terminal device is configured to transmit to the external server a second function execution request in response to receiving the instruction operation while displaying the second specification screen. The second function execution request does not include the M1 number of setting values for the first setting category. The second function execution instruction is received after the second function execution request is transmitted from the terminal device to the external server. The (e2) controlling controls, in response to receiving the second function execution instruction, the image processing unit to execute the image process in accordance with a second setting including a second setting value for the first setting category.

BRIEF DESCRIPTION OF THE DRAWINGS

The particular features and advantages of the disclosure as well as other objects will become apparent from the following description taken in connection with the accompanying drawings, in which:

FIG. 1B is an explanatory diagram illustrating a user management table and a value of a limitation flag stored in a memory of the printer when the printer is in a first state;

FIG. 1C is an explanatory diagram illustrating the user management table and a value of the limitation flag stored in the memory of the printer when the printer is in a second state;

DETAILED DESCRIPTION

First Embodiment

<Structure of a Communication System 2>

Figure 1A:
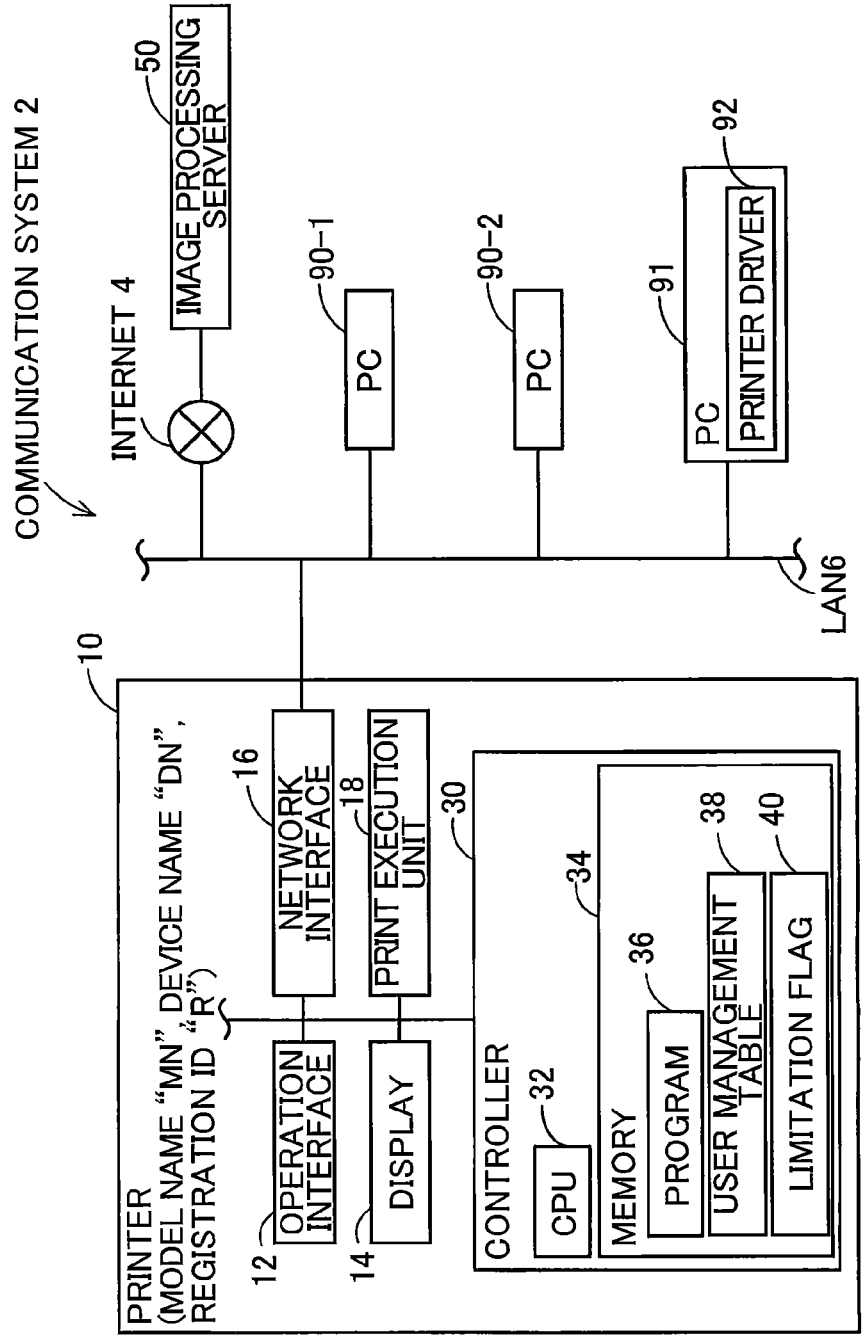
FIG. 1A is an explanatory diagram illustrating a structure of a communication system including a printer, an image processing server, and a plurality of personal computers according to a first embodiment of the present disclosure.

Next, the structure of a communication system 2 will be described with reference to FIGS. 1A through 1C. The communication system 2 is provided with a printer 10, an image processing server 50, and a plurality of personal computers (abbreviated herein as "PCs") 90-1, 90-2, and 91. In the following description, the image processing server 50 will be simply called the "server 50." The printer 10 and the PCs 90-1 and the like are connected to the same local area network (abbreviated herein as "LAN") 6 and are further connected to Internet 4 via the LAN 6. The server 50 is connected to the Internet 4. Accordingly, the printer 10 and the PCs 90-1 and the like can communicate with the server 50 via the Internet 4.

<Structure of the Printer 10>

The printer 10 is a peripheral device that can execute printing operations (i.e., a device peripheral to the PCs 90-1 and the like). The printer 10 has a model name "MN," a device name "DN," and a registration ID "R." The registration ID "R" is preset on the printer 10 for identifying the printer 10, and to be registered on the server 50. The printer 10 is provided with an operation interface 12, a display 14, a network interface 16, a print execution unit 18, and a controller 30. All components 12, 14, 16, 18, and 30 are connected to a bus line (not provided with a reference numeral).

The operation interface 12 is provided with a plurality of keys. By operating the operation interface 12, the user can input various instructions into the printer 10. The display 14 functions to display various information. The network interface 16 is connected to the LAN 6. The print execution unit 18 is provided with a printing mechanism employing an inkjet system or a laser system, for example.

The controller 30 is provided with a CPU 32, and a memory 34. The CPU 32 executes various processes according to a program 36 stored in the memory 34. The memory 34 is configured of volatile memory, nonvolatile memory, and the like. The memory 34 also stores a user management table 38, and a limitation flag 40.

The user management table 38 correlates login status information, a username, a password, account information, and limitation information for each of one or more users that use the printer 10. In the following description, the user management table 38 will simply be referred to as the "table 38." The username and the password are information identifying a user and are used by the user to log in to the printer 10. The account information is information that the user uses to log in to the server 50. The administrator of the printer 10 stores a username, a password, and account information in the table 38 for each user, for example. The login status information has one of the values "LOGGED IN" and "LOGGED OUT." "LOGGED IN" indicates that the user is currently logged in to the printer 10, while "LOGGED OUT" indicates that the user is not currently logged in to the printer 10.

The limitation information specifies one or more values available to the corresponding user for each of one or more setting categories used for printing operations executed by the printer 10. In the present embodiment, there are two setting categories for printing, a color setting and a printing-sides setting. For the color setting, there are two possible values, "COLOR" and "MONOCHROME." The "COLOR" setting indicates that the user is permitted to print in color, while the "MONOCHROME" setting indicates that the user is permitted to print in monochrome. There are also two possible values, "SIMPLEX" and "DUPLEX," for the printing-sides setting. The "SIMPLEX" setting indicates that the user is permitted to perform simplex printing to print images on one side of the printing medium, while the "DUPLEX" setting indicates that the user is permitted to perform duplex printing to print images on both sides of the printing medium. In other words, in the present embodiment, there are four possible print settings formed through combinations of the two setting values for the color setting (hereinafter also called "two color settings") and the two setting values for the printing-sides settings (hereinafter also called "two printing-sides settings").

In the example of FIGS. 1B and 1C, the user identified by username "UN1" and password "P1" (hereinafter called the "first user") is allowed to use both the two color setting values, "COLOR" and "MONOCHROME," and both the two printing-sides setting values, "SIMPLEX" and "DUPLEX." Hence, the first user can use any of the four print settings formed through combinations of the two values "COLOR" and "MONOCHROME" and the two values "SIMPLEX" and "DUPLEX." Note that the limitation information may include other settings in addition to color settings and printing-sides settings, such as settings for sizes of printing paper and numbers of sheets.

The limitation flag 40 is set to one of the values "ON" and "OFF." The "ON" setting indicates that the user is limited in using print settings according to the limitation information in the table 38. In other words, when the limitation flag 40 is set to "ON," the user is permitted to use settings indicated by the limitation information. The "OFF" setting indicates that the user is not limited in using print settings, and the user can set any settings settable for the printer 10.

<Structure of the Image Processing Server 50>

The server 50 is a Google Cloud Print (abbreviated herein as "GCP") server provided by Google (registered trademark), for example, that is connected to the Internet 4. As a variation, the server 50 may be a server provided by the vendor of the printer 10, for example. The server 50 functions to mediate printing operations between the printer 10 and each of the PCs 90-1 and the like. That is, the server 50 converts an image file submitted by the PC 90-1, for example, generates print data in a format that the printer 10 can interpret, and transmits this print data to the printer 10. Accordingly, the PC 90-1 can allow the printer 10 to execute printing operations by submitting an image file to the server 50 and need not be provided with a printer driver for converting image files to print data. The users of the printer 10 preregisters their account information (information for a Google account, for example) on the server 50.

<Structure of the PCs 90-1, 90-2, and 91>

The PCs 90-1 and 90-2 are not provided with a printer driver for executing printing operations on the printer 10. The PC 91 is provided with a printer driver 92 for executing printing operations on the printer 10. Each of the PCs 90-1, 90-2, and 91 is provided with a web browser (not illustrated), such as Google Chrome (registered trademark). In the present embodiment, the PCs 90-1 and the like are stationary terminal devices (desktop computers, for example). However, as a variation the PCs 90-1 and the like may be configured of portable terminal devices such as mobile telephones (smartphones, for example), personal digital assistants (PDAs), notebook computers, or tablet computers.

<Normal Printing Process>

Figure 2:
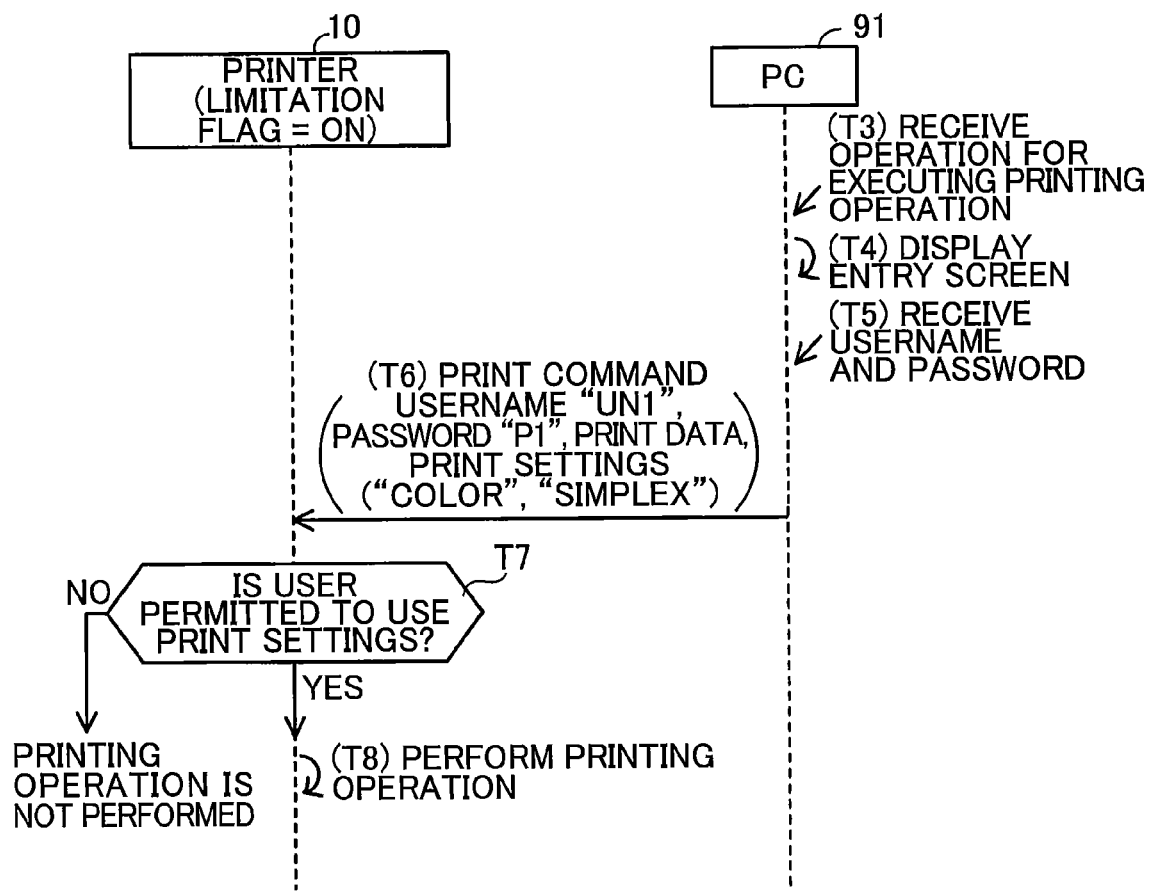
FIG. 2 is a sequence diagram illustrating a normal printing process for executing a printing operation on the printer without using the server according to the first embodiment.

Next, a normal printing process executed by the printer 10 and PC 91 will be described with reference to FIG. 2. In the normal printing process, the PC 91 controls the printer 10 to execute a printing operation by transmitting print data generated by the printer driver 92 to the printer 10. In other words, in the normal printing process the PC 91 prints on the printer 10 without going through the server 50. As indicated in FIG. 2, the limitation flag 40 of the printer 10 is set to "ON" in the normal printing process. To facilitate understanding, the CPU of each device (such as the CPU 32 of the printer 10) will not be described as the agent which executes operations, but rather each device itself (the printer 10, for example) will be described as the agent. Further, all communications performed by the printer 10 are implemented via the network interface 16. With this understanding, the following description omits the expression "via the network interface 16."

In T3 of FIG. 2, the first user executes an operation for executing a printing operation on the PC 91. The operation for executing the printing operation includes an operation for selecting an image file representing a target image for printing, and an operation for specifying print settings. In the normal printing process, the PC 91 uses the printer driver 92 to convert the image file in conformance with the print settings to generate print data having a format that the printer 10 can interpret.

In T4 the PC 91 displays an entry screen in which the user can input a username and a password. In T5 the PC 91 accepts from the first user input for a username and a password. In the example of FIG. 2, the first user inputs the username "UN1" and the password "P1." In T6 the PC 91 transmits a print command to the printer 10 for controlling the printer 10 to execute a printing operation. The print command includes the username "UN1" and the password "P1" inputted in T5, the converted print data, and the print settings specified in T3 (color and simplex in the example of FIG. 2).

In T6 the printer 10 receives the print command from the PC 91. In T7 the printer 10 determines that the limitation flag 40 in the memory 34 is set to "ON" and determines whether the first user is permitted to use the print settings that are included in the print command. Specifically, the printer 10 identifies the limitation information in the table 38 associated with the username "UN1" and the password "P1." Next, the printer 10 determines whether use of the print settings included in the print command (i.e., color and simplex) are permitted using the identified limitation information. In this example, the printer 10 determines that the first user is permitted to use the print settings (T7: YES), and in T8 controls the print execution unit 18 to perform a printing operation based on the print settings (color and simplex) and the print data included in the print command. The printer 10 does not execute a printing operation when determining that use of the print settings included in the print command is not allowed (T7: NO).

As described above, when an instruction to execute a printing operation is issued from the first user and is not issued via the server 50 (T6), the printer 10 executes a printing operation that conforms with print settings available to the first user on the basis of limitation information in the table 38 associated with the first user and does not execute a printing operation conforming with print settings not available to the first user. This method can prevent the printer 10 from executing a printing operation conforming with print settings that the user is not allowed to use.

<Registration Process: Case A>

Figure 3:
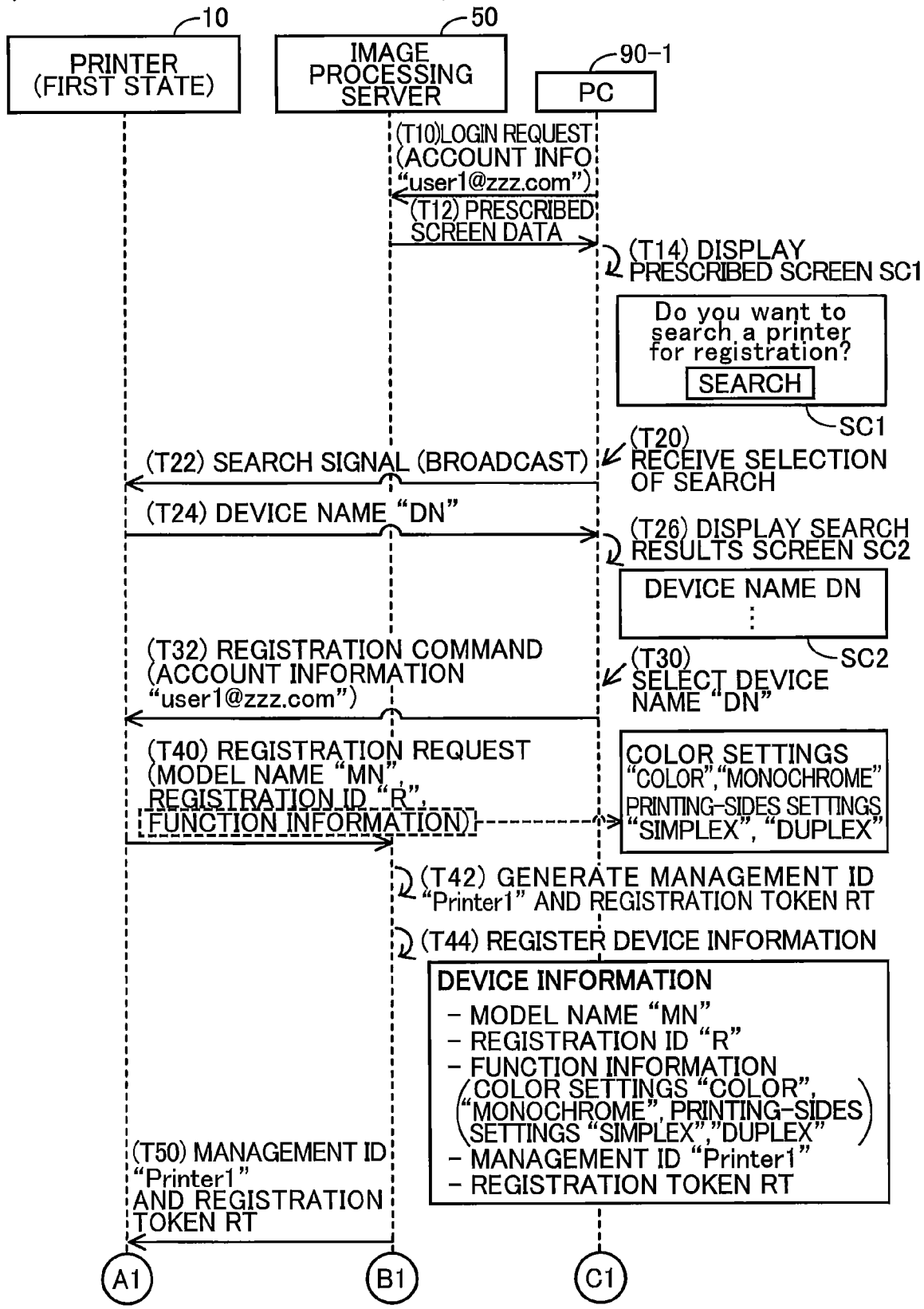
FIG. 3 is a sequence diagram illustrating a part of a registration process for registering the printer on the server in Case A according to the first embodiment.
Figure 4:
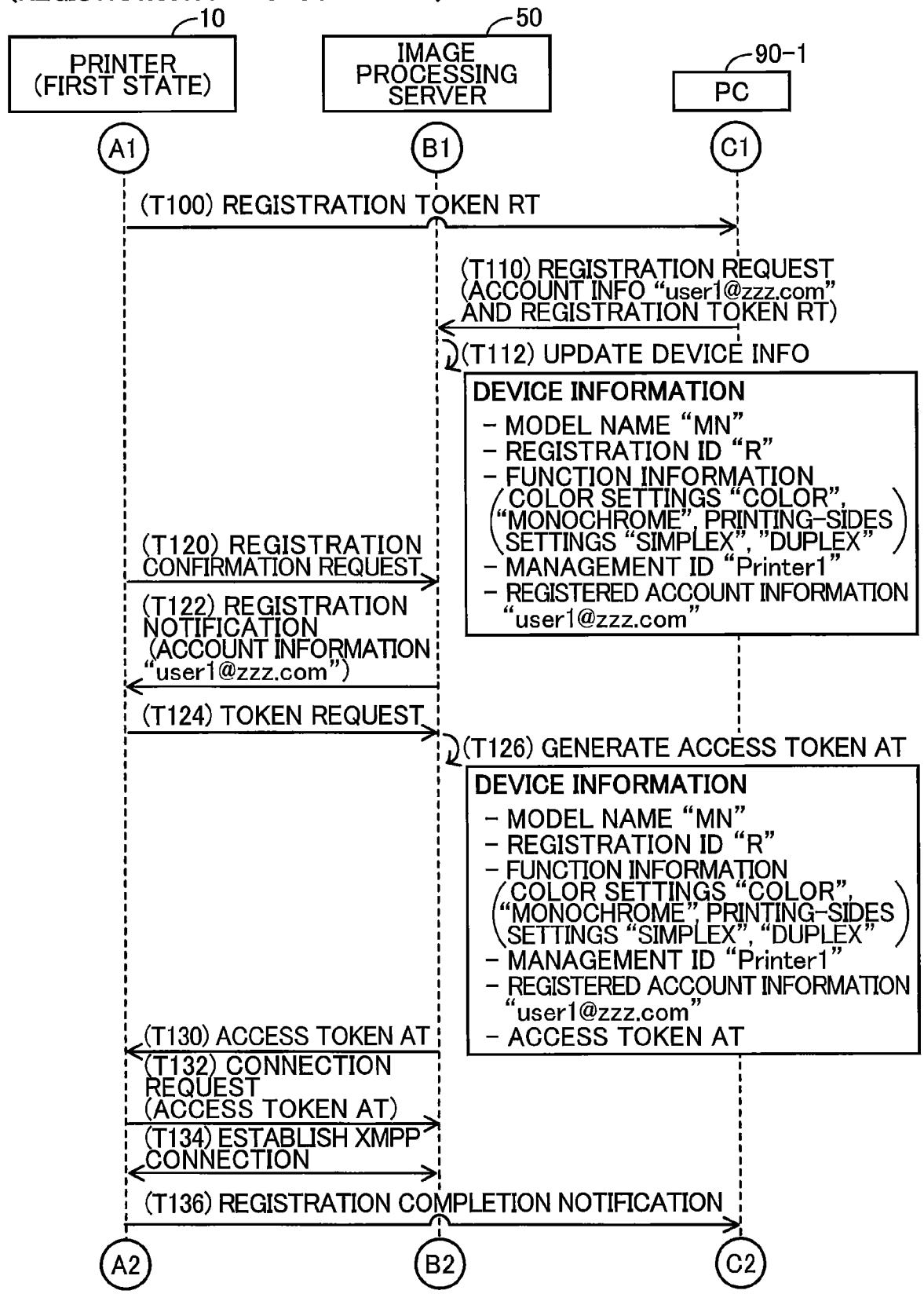
FIG. 4 is a sequence diagram illustrating a remaining part of the registration process in Case A according to the first embodiment.

Next, a registration process for registering the printer 10 on the server 50 will be described with reference to FIGS. 3 and 4. The registration process illustrated in FIGS. 3 and 4 is a first case that will hereinafter be referred to as "Case A" of the registration process. The process of Case A is executed when the printer 10 is in a first state. The first state is one of state A and state B described below. State A: the limitation flag 40 is set to "ON," and limitation information respectively corresponding to all users including the first user and the user identified by username "UN2" and password "P2" (hereinafter called the "second user") indicate that all the users including the first user and the second user are allowed use of both color settings, "COLOR" and "MONOCHROME," and both printing-sides settings, "SIMPLEX" and "DUPLEX." State B: the limitation flag 40 is set to "OFF."

The registration process begins when the PC 90-1 receives input for the account information "user1@zzz.com" and an instruction to log in to the server 50 from the first user identified by the username "UN1" and the password "P1." In T10, the PC 90-1 transmits a login request including this account information to the server 50.

In T10 the server 50 receives the login request from the PC 90-1. When the account information included in the login request has been registered on the server 50, in T12 the server 50 transmits prescribed screen data representing a prescribed screen SC1 to the PC 90-1.

Upon receiving the prescribed screen data from the server 50 in T12, in T14 the PC 90-1 displays the prescribed screen SC1 represented by the prescribed screen data. The prescribed screen SC1 includes a SEARCH button for issuing an instruction to search for printers present in the vicinity of the PC 90-1. In T20 the first user selects the SEARCH button in the prescribed screen SC1, prompting the PC 90-1 to broadcast a search signal over the LAN 6 in order to search for printers.

In T22 the printer 10 receives the search signal from the PC 90-1, and in T24 transmits the device name "DN" of the printer 10 to the source of the search signal, i.e., the PC 90-1.

After receiving the device name "DN" from the printer 10 in T24, in T26 the PC 90-1 displays a search results screen SC2 that includes the received device name "DN." In T30 the PC 90-1 receives a selection for the device name "DN" from the first user. In this case, in T32 the PC 90-1 transmits to the printer 10 having the device name "DN" a registration command that includes the account information "user1@zzz.com," which is the account information for the user currently logged in to the server 50. The registration command is for instructing the printer 10 to register information related to the printer 10 on the server 50.

Upon receiving the registration command from the PC 90-1 in T32, the printer 10 executes the following process. Since the limitation flag 40 is set to "ON" when the printer 10 is in state A, the printer 10 confirms the limitation information for each user and determines that all users are allowed use of both color settings "COLOR" and "MONOCHROME" and all users are allowed use of both printing-sides settings "SIMPLEX" and "DUPLEX." Further, since the limitation flag 40 is "OFF" when the printer 10 is in state B, the printer 10 determines that all users are allowed use of both color settings "COLOR" and "MONOCHROME" and that all users are allowed use of both printing-sides settings "SIMPLEX" and "DUPLEX," without confirming the limitation information for each user. Thus, whether the printer 10 is in state A or state B, the printer 10 sets both values "COLOR" and "MONOCHROME" for the color setting and both values "SIMPLEX" and "DUPLEX" for the printing-sides setting in the registration request. Next, in T40 the printer 10 transmits the registration request to the server 50. The registration request is for requesting the server 50 to register the printer 10 and includes the model name "MN" of the printer 10, the registration ID "R" preset on the printer 10, and function information. The function information includes the two setting values "COLOR" and "MONOCHROME" for the color setting and the two setting values "SIMPLEX" and "DUPLEX" for the printing-sides setting.

Upon receiving the registration request from the printer 10 in T40, the server 50 determines whether the registration ID "R" included in the registration request is already registered on the server 50. In this case, the server 50 determines that the registration ID "R" has not yet been registered and executes the process from T42. However, if the server 50 determines that the registration ID "R" is already registered, the server 50 ends the registration process without executing the steps beginning from T42.

In T42 the server 50 generates a management ID "Printer1" and a registration token RT. Here, the server 50 generates the management ID "Printer1" and the registration token RT with unique values that were not previously generated for a management ID and a registration token. In T44 the server 50 registers the device information. The device information is information correlating values for various items included in the registration request of T40 (i.e., the model name "MN," the registration ID "R," and the function information (i.e., the color settings "COLOR" and "MONOCHROME" and the printing-sides settings "SIMPLEX" and "DUPLEX")) with the generated management ID "Printer1" and the generated registration token RT. In T50 the server 50 transmits the management ID "Printer1" and the registration token RT to the printer 10.

When the printer 10 receives the management ID "Printer1" and the registration token RT from the server 50 in T50 of FIG. 3, in T100 of FIG. 4 the printer 10 transmits the registration token RT to the PC 90-1. At this time, the printer 10 begins periodically transmitting a registration confirmation request (see T120 described later) to the server 50 in order to confirm whether registration of the account information "user1@zzz.com" on the server 50 is complete.

After receiving the registration token RT from the printer 10 in T100, in T110 the PC 90-1 transmits a registration request to the server 50 that includes the account information "user1@zzz.com" and the registration token RT. The registration request is a command for requesting the server 50 to register the account information.

When the server 50 receives the registration request from the PC 90-1 in T110, in T112 the server 50 determines whether the registration token RT included in the registration request matches the registration token RT registered on the server 50 in T44 of FIG. 3. In this case, the server 50 determines that the registration tokens match and updates the device information. Specifically, the server 50 registers in the device information the account information "user1@zzz.com" included in the registration request as registered account information so as to be in association with the various values in the device information registered on the server 50 in T44 of FIG. 3. Note that since the registration token RT will not be used in subsequent steps, the registration token RT has been omitted from the device information illustrated beginning from step T112 in FIG. 4.

In T120 the server 50 receives the registration confirmation request from the printer 10. In this case, the server 50 transmits a registration notification to the printer 10 in T122 that includes the registered account information "user1@zzz.com." This registration notification is information for notifying the printer 10 that registration of the account information is complete.

When the printer 10 receives the registration notification from the server 50 in T122, in T124 the printer 10 transmits a token request to the server 50. The token request is a command for requesting the server 50 to transmit an access token.

Upon receiving the token request from the printer 10 in T124, in T126 the server 50 generates an access token AT configured of a unique character string. The server 50 also registers this access token AT so as to be in association with the various values in the device information updated in T112. In T130 the server 50 transmits the access token AT to the printer 10. The server 50 may also generate a refresh token for producing a new access token in the event that the period of validity for the access token AT has expired, and may transmit this refresh token to the printer 10. In general, the server 50 may transmit any information capable of authenticating the printer 10.

Upon receiving the access token AT from the server 50 in T130, the printer 10 stores the access token AT in the memory 34 and in T132 transmits a connection request to the server 50 that includes the access token AT. The connection request is a command for requesting the server 50 to establish an eXtensible Messaging and Presence Protocol (abbreviated herein as "XMPP") connection, also referred to as a continuous connection.

Upon receiving the connection request from the printer 10 in T132, the server 50 determines that the access token AT included in the connection request matches the access token AT in the registered device information (see T126) and in T134 establishes an XMPP connection with the printer 10. Once the XMPP connection has been established in this way, the server 50 can use the XMPP connection to send signals (a job notification in T300 of FIG. 7 described later, for example) to the printer 10 through the firewall of the LAN 6 without needing to receive signals from the printer 10.

Further, once the XMPP connection has been established with the server 50 in T134, in T136 the printer 10 transmits a registration completion notification to the PC 90-1. The registration completion notification is information for specifying that registration on the server 50 is complete. Once the process in T136 has been completed, the process for Case A of the registration process ends.

<Sharing Process>

Figure 5:
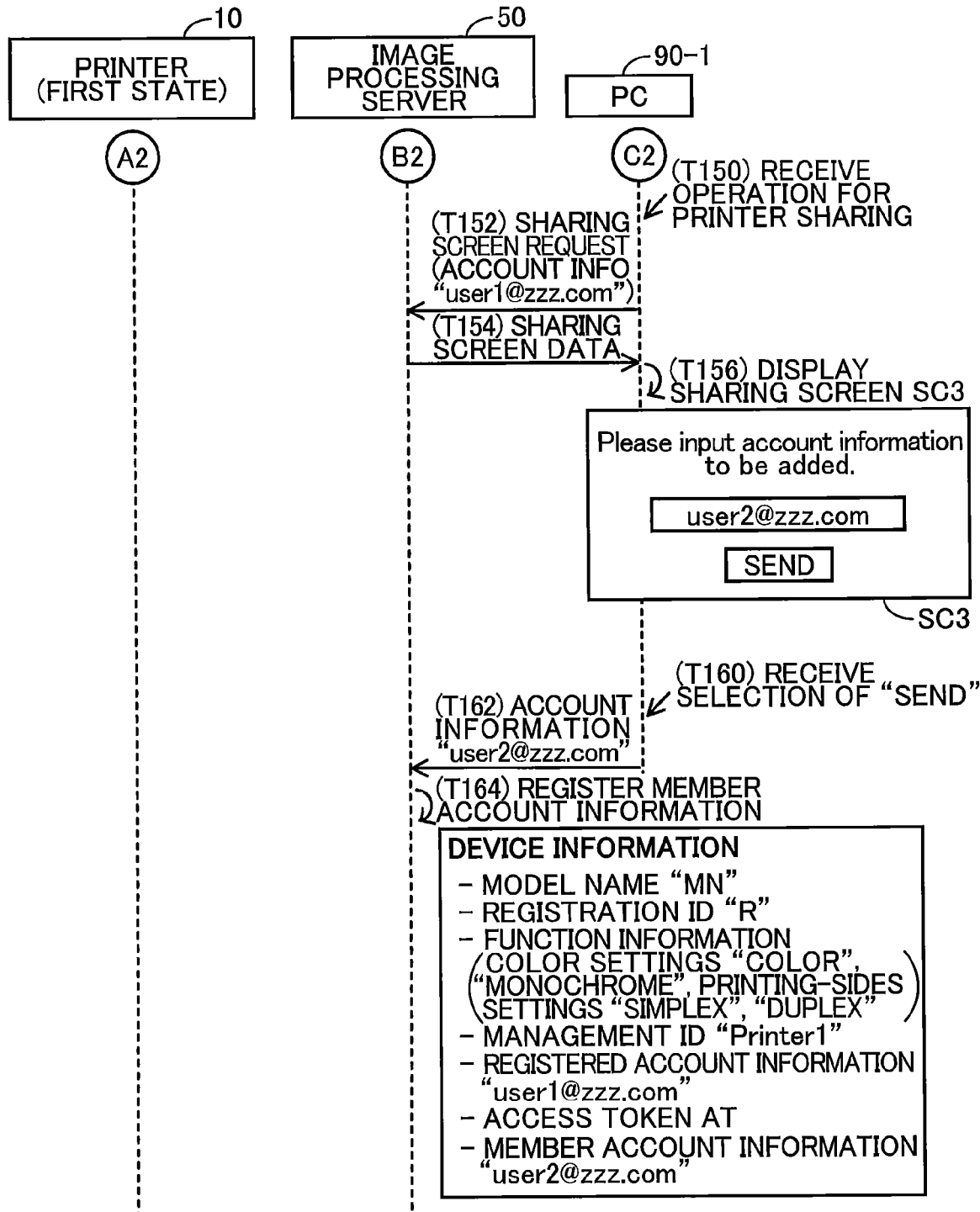
FIG. 5 is a sequence diagram illustrating a sharing process for sharing the printer registered on the server among a plurality of users according to the first embodiment.

Next, a sharing process for sharing the printer 10 registered on the server 50 with other users will be described with reference to FIG. 5. The process of FIG. 5 is executed after the first user has executed the registration process in FIGS. 3 and 4. As described above, the registration ID "R" for the printer 10 is registered on the server 50 in T44 of FIG. 3. Therefore, if the second user using the account information "user2@zzz.com" performs the same process in T10 through T40 of FIG. 3, the server 50 does not execute the process beginning from T42 since the registration ID "R" is already registered on the server 50. Therefore, in the present embodiment the sharing process described below is implemented in order to share the printer 10 among a plurality of users.

In T150 of FIG. 5, the PC 90-1 receives input from the first user for the account information "user1@zzz.com" and a printer sharing operation for sharing the printer 10 with other users. In T152 the PC 90-1 transmits a sharing screen request including this account information "user1@zzz.com" to the server 50.

When the server 50 receives the sharing screen request from the PC 90-1 in T152, in T154 the server 50 transmits sharing screen data representing a sharing screen SC3 to the PC 90-1.

Upon receiving the sharing screen data from the server 50 in T154, in T156 the PC 90-1 displays the sharing screen SC3 represented by the sharing screen data. The sharing screen SC3 includes an entry field for inputting account information which identifies a user who will share the printer 10, and a SEND button for transmitting the account information inputted in this entry field to the server 50.

In T160 the PC 90-1 receives from the first user input including the account information "user2@zzz.com" for the second user, and a selection for the SEND button. In this case, in T162 the PC 90-1 transmits the inputted information "user2@zzz.com" for an account to the server 50.

When the server 50 receives from the PC 90-1 the account information for the account in T162, in T164 the server 50 registers the account information "user2@zzz.com" for the account as member account information for sharing so as to be in association with the values in the device information updated in T126 of FIG. 4. In this way, the second user can use his/her own account information to execute printing operations on the printer 10 via the server 50.

<Server Printing Process: Case A>

Figure 6:
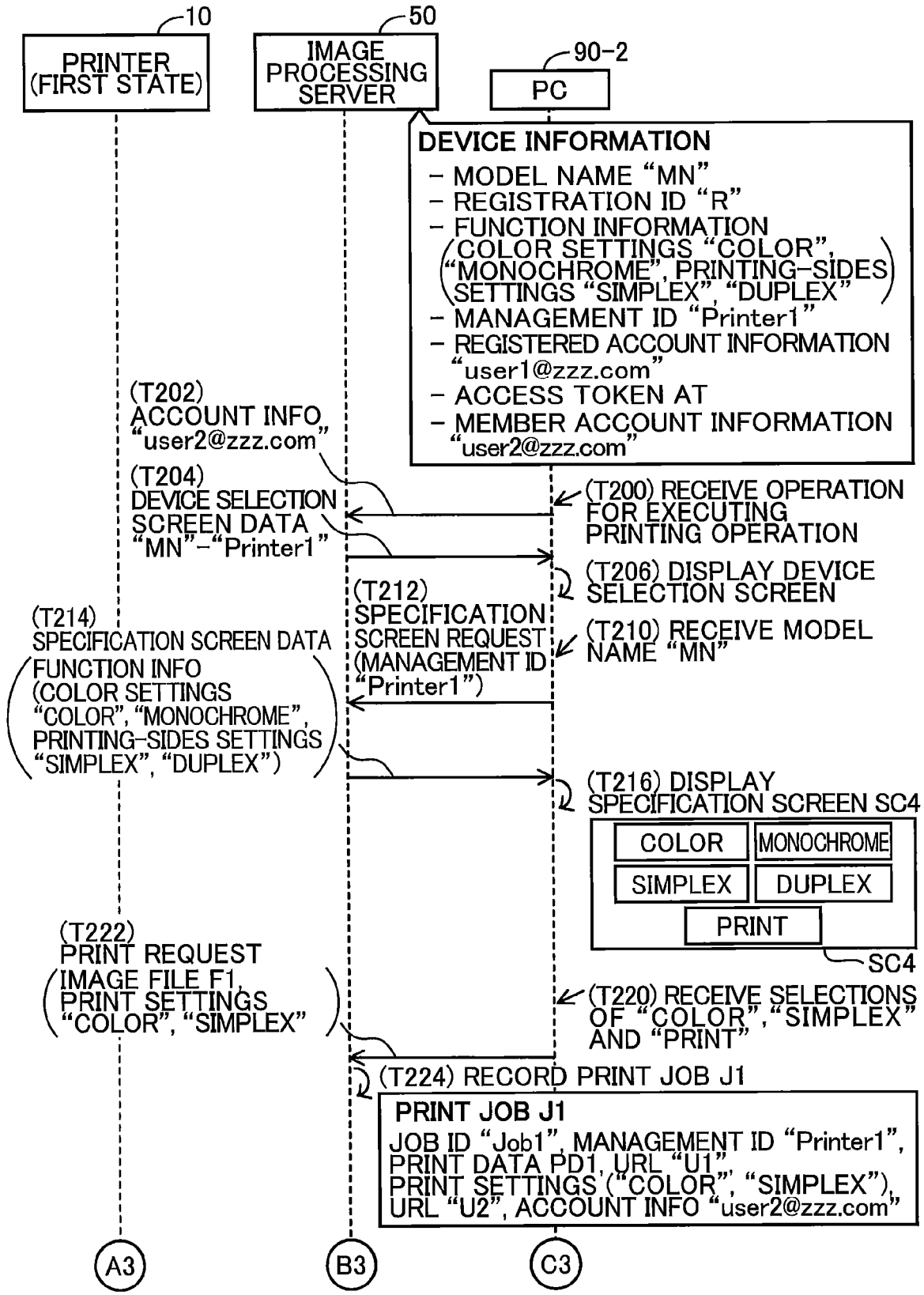
FIG. 6 is a sequence diagram illustrating a part of a server printing process for executing a printing operation on the printer using the server in Case A according to the first embodiment.

Next, a server printing process for executing a printing operation on the printer 10 using the server 50 will be described with reference to FIGS. 6 and 7. The server printing process in this example is a first case that will hereinafter be referred to as Case A of the server printing process. The process of FIG. 6 is executed after the sharing process in FIG. 5 has been executed. In T200 of FIG. 6, the PC 90-2 receives input from the second user for the account information "user2@zzz.com," and an operation for executing a printing operation on the printer 10. Upon receiving this input, in T202 the PC 90-2 transmits this account information "user2@zzz.com" to the server 50.

When the server 50 receives account information from the PC 90-2 in T202, in T204 the server 50 identifies the device information that includes the account information "user2@zzz.com," and transmits device selection screen data to the PC 90-2 that includes information indicating that the model name "MN" and the management ID "Printer1," which are included in the identified device information, are correlated with each other.

When the PC 90-2 receives the device selection screen data from the server 50 in T204, in T206 the PC 90-2 displays the device selection screen represented by this screen data (not illustrated). The device selection screen includes the model name "MN." When the second user selects the model name "MN" in the device selection screen, the PC 90-2 receives this selection in T210, and in T212 transmits to the server 50 a specification screen request that includes the management ID "Printer1" associated with the model name "MN." The specification screen request is a command for requesting the server 50 to transmit data representing a screen for selecting print settings.

When the server 50 receives the specification screen request from the PC 90-2 in T212, the server 50 identifies the function information (i.e., the color settings "COLOR" and "MONOCHROME" and the printing-sides settings "SIMPLEX" and "DUPLEX") associated with the management ID "Printer1" that is included in the specification screen request. The server 50 generates specification screen data representing a specification screen SC4 in which a user can select one print setting combination from among the four print setting combinations specified by the identified function information. In T214 the server 50 transmits this specification screen data to the PC 90-2.

When the PC 90-2 receives the specification screen data from the server 50 in T214, in T216 the PC 90-2 displays the specification screen SC4 represented by this specification screen data. The specification screen SC4 includes buttons for specifying a setting value for the color setting (i.e., "COLOR" and "MONOCHROME"), buttons for specifying a setting value for the printing-sides setting (i.e., "SIMPLEX" and "DUPLEX"), and a PRINT button for executing the printing operation on the printer 10. In T220 the PC 90-2 receives the specifications "COLOR" and "SIMPLEX" in the specification screen SC4 and a selection for the PRINT button from the second user, thereby receiving print settings, that is, one print setting combination. Subsequently, the PC 90-2 receives a selection for an image file F1, which is stored in the PC 90-2 for example, representing the image to be printed through an operation by the second user. In T222 the PC 90-2 transmits a print request to the server 50 that includes the image file F1 and the specified print settings (i.e., "COLOR" and "SIMPLEX").

When the server 50 receives the print request from the PC 90-2 in T222, in T224 the server 50 converts the image file F1 into print data PD1 having a data format that the printer 10 can interpret, and generates a job ID "Job1" as information for specifying a print job J1. Next, the server 50 records the print job J1 therein. The print job J1 includes the job ID "Job1" generated above, the management ID "Printer1" received in T212, the print data PD1 generated above, a uniform resource locator (abbreviated herein as "URL") "U1" specifying the storage location for the print data PD1 on the server 50, the print settings received in T222 (i.e., "COLOR" and "SIMPLEX"), a URL "U2" specifying the storage location for the print settings on the server 50, and the account information "user2@zzz.com" received in T202.

Note that the process described with reference to FIG. 6 assumes that the printer 10 is in state A of the first state, i.e., that the limitation flag 40 is set to "ON." After the server 50 has recorded the print job J1 in T224 of FIG. 6, in T300 of FIG. 7 the server 50 uses the XMPP connection (see T134 of FIG. 4) to transmit a job notification including the management ID "Printer1" to the printer 10. The job notification is information notifying the printer 10 that a print job has been recorded.

When the printer 10 receives the job notification from the server 50 in T300, in T310 the printer 10 transmits a job list request to the server 50. The job list request is a command for requesting the server 50 to transmit job list data representing a list of print jobs recorded on the server 50. The job list request includes the management ID "Printer1" and the access token AT.

When the server 50 receives the job list request from the printer 10 in T310, in T312 the server 50 identifies the print job J1 that includes the management ID "Printer1" matching the management ID included in the job list request, and transmits to the printer 10 job list data that includes information indicating that the job ID "Job1" and the account information "user2@zzz.com," which are included in the identified print job J1, are correlated with each other.

When the printer 10 receives the job list data from the server 50 in T312, the printer 10 determines that the limitation flag 40 in the memory 34 is "ON." Next, the printer 10 determines whether the second user associated with the account information "user2@zzz.com" in the job list data is logged in to the printer 10. In this case, the printer 10 determines that the second user is not logged in to the printer 10 and discards the job list data without displaying a job list based on this data on the display 14.

In T314 the printer 10 receives a login operation from the second user that includes input of the username "UN2" and password "P2." Upon receiving the login operation, in T316 the printer 10 modifies the login information associated with the username "UN2" and password "P2" in the table 38 from "LOGGED OUT" to "LOGGED IN." In this case, the printer 10 transmits a job list request to the server 50 in T320 that includes the management ID "Printer1" and the access token AT.

Step T322 is identical to T312. When the printer 10 receives job list data from the server 50 in T322, the printer 10 determines that the login status information in the table 38 corresponding to the account information "user2@zzz.com" is "LOGGED IN," i.e., that the second user is logged in to the printer 10. In this case, the printer 10 displays a job list on the display 14 in T324 that includes the job ID "Job1" associated with the account information "user2@zzz.com."

In T330 the printer 10 receives a selection from the second user for the job ID "Job1" in the job list. After receiving this selection, in T332 the printer 10 transmits a print job request to the server 50 that includes the job ID "Job1" and the management ID "Printer1."

After receiving the print job request from the printer 10 in T332, in T334 the server 50 identifies the print job J1 including the job ID "Job1" matching the job ID included in the received print job request, and transmits a print command to the printer 10 that includes the account information "user2@zzz.com," the URL "U1," and the URL "U2" included in the identified print job J 1.

When the printer 10 receives the print command from the server 50 in T334, the printer 10 performs the following steps in order to execute the printing operation. First, in T340 the printer 10 accesses the server 50 using the URL "U2" in the print command and in T342 receives the print settings (i.e., "COLOR" and SIMPLEX") from the server 50. Next, in T350 the printer 10 accesses the server 50 using the URL "U1" in the print command, and in T352 receives the print data PD1 from the server 50. In T360 the printer 10 controls the print execution unit 18 to execute the printing operation according to the print settings received in T342 and the print data PD1 received in T352.

In T370 the printer 10 transmits a completion notification including the job ID "Job1" to the server 50. The completion notification is information used to notify the server 50 that the print job J1 has been processed.

After receiving the completion notification from the printer 10 in T370, in T372 the server 50 deletes the print job J1 that includes the job ID "Job1." After completing the process in T372, the server printing process in Case A ends.

Note that if the printer 10 receives job list data from the server 50 in T312 while in state B of the first state, i.e., when the limitation flag 40 is set to "OFF," the printer 10 executes the process beginning from T332 without executing the process in T314 through T330.

<Registration Process: Case B>

Next, a second case for the registration process that will hereinafter be referred to as "Case B" will be described with reference to FIG. 8. The process of Case B is executed in place of the process of Case A (see FIGS. 3 and 4) when the printer is in the second state. In the second state, the setting values for the two setting categories specified by limitation information corresponding to the second user differ from the setting values for the first user, and the limitation flag 40 is set to "ON." Specifically, in the second state, the limitation information corresponding to the first user specifies both two setting values for each setting category, whereas the limitation information corresponding to the second user does not specify all setting values for two setting categories. More specifically, in this case, it will be assumed that the second user is permitted use of the single setting value "MONOCHROME" for the color setting and both setting values "SIMPLEX" and "DUPLEX" for the printing-sides setting, as illustrated in FIG. 1C.

The same process described in T10 through T30 of FIG. 3 is also initially executed in this case. When the printer 10 receives a registration command from the PC 90-1 in T432, the printer 10 uses the limitation information for each user to determine whether all users are allowed use of the two color settings "COLOR" and "MONOCHROME." In this case, the printer 10 determines that the second user is not permitted use of the setting "COLOR" and does not include the two setting values for the color setting in the registration request. Next, the printer 10 determines whether all users are permitted use of the two printing-sides settings "SIMPLEX"

and "DUPLEX." In this case, the printer 10 determines that all users are permitted use of the two printing-sides settings and includes both setting values for the printing-sides setting in the registration request. In T440 the printer 10 transmits the registration request to the server 50. This registration request includes the model name "MN" of the printer 10, the registration ID "R" preset for the printer 10, and function information. The function information does not include any of the setting values for the color setting, but includes both setting values "SIMPLEX" and "DUPLEX" for the printing-sides setting.

In T442 the server 50 performs the same process described in T42 of FIG. 3. In T44 the server 50 registers the device information. The device information differs from that in T44 of FIG. 3 in that the function information does not include any of the setting values for the color setting. Step T450 is identical to step T50 in FIG. 3. Thereafter, the same process described in T100 through T136 of FIG. 4 and T150 through T164 of FIG. 5 is executed. Hence, the server 50 records device information correlating the model name "MN," the registration ID "R," the function information (i.e., the color setting "NULL" and the printing-sides settings "SIMPLEX" and "DUPLEX"), the management ID "Printer1," the registered account information "user1@zzz.com," the access token AT, the registration token RT, and the member account information for an account (i.e., "user2 @ zzz.com").

<Server Printing Process: Case B>

Next, a second case of the server printing process (hereinafter called "Case B" of the server printing process) will be described with reference to FIGS. 9 through 13. The process of FIG. 9 is executed after the process of FIG. 8. Steps T500 through T512 are identical to steps T200 through T212 of FIG. 6, except that the PC 90-1 is being used instead of the PC 90-2 and that the account information "user1 @zzz.com" is used for the first user. When the server 50 receives the specification screen request from the PC 90-1 in T512, the server 50 identifies the function information (i.e., color setting "NULL" and printing-sides settings "SIMPLEX" and "DUPLEX") associated with the management ID "Printer1" that is included in the specification screen request. The server 50 generates specification screen data representing a specification screen SC5 that conforms to the identified function information. Subsequently, in T514 the server 50 transmits this specification screen data to the PC 90-1.

Upon receiving the specification screen data from the server 50 in T514, in T516 the PC 90-1 displays the specification screen SC5 represented by the specification screen data. This specification screen includes a PRINT button, and buttons for specifying one of the setting values corresponding to the two printing-sides settings (i.e., "SIMPLEX" and "DUPLEX"), but does not include buttons for specifying values for the color setting since the function information in the device information includes the color setting "NULL". In other words, the first user cannot specify a setting value for the color setting in the specification screen. In T520 the PC 90-1 receives a specification for "SIMPLEX" in the specification screen and a selection of the PRINT button from the first user and subsequently receives the selection of an image file F2 which is stored in the PC 90-1 for example. Next, in T522 the PC 90-1 transmits a print request to the server 50 that includes the image file F2, and the specified print setting (i.e., "SIMPLEX").

When the server 50 receives the print request from the PC 90-1 in T522, in T524 the server 50 converts the image file F2 to generate print data PD2 and generates a job ID "Job2" for specifying a print job J2. Next, the server 50 records the print job J2. The print job J2 includes the job ID "Job2" generated above, the management ID "Printer1" received in T512, the print data PD2 generated above, a URL "U3" specifying the storage location of the print data PD2, the print setting received in T522 (i.e., "SIMPLEX"), a URL "U4" specifying the storage location of the print setting, and the account information "user1@zzz.com" received in T502.

Figure 7:
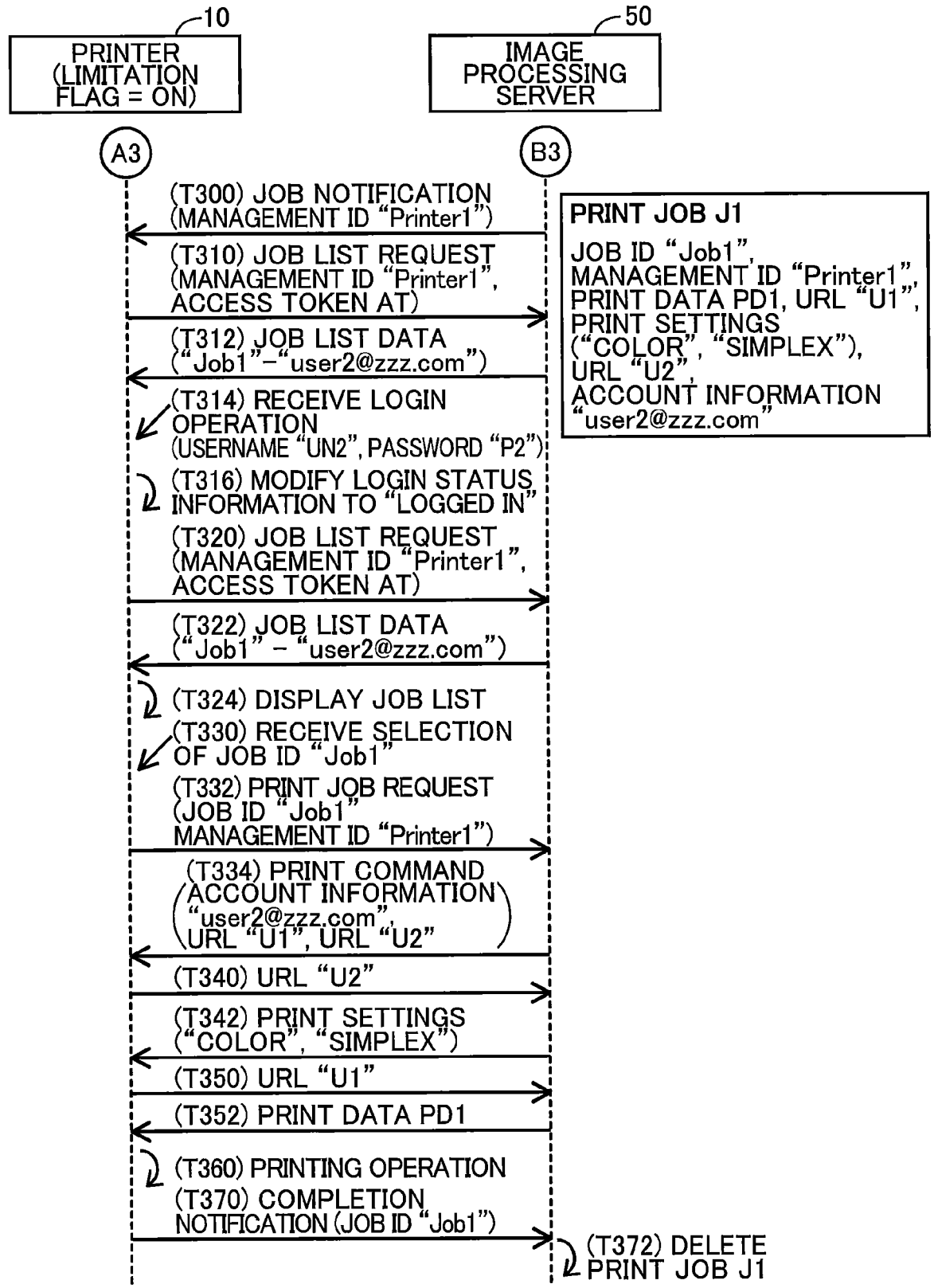
FIG. 7 is a sequence diagram illustrating a remaining part of the server printing process in Case A according to the first embodiment.

Steps T530 and T532 are identical to steps T300 and T310 of FIG. 7. In T534 the server 50 identifies the print job J2 that includes the management ID "Printer1" and transmits to the printer 10 job list data that includes the job ID "Job2" and the account information "user1 @ zzz.com" that are included in the identified print job J2.

When the printer 10 receives the job list data from the server 50 in T534 of Case B, the printer 10 determines that the limitation flag 40 in the memory 34 is set to "ON" and subsequently determines whether the first user associated with the account information "user1 @zzz.com" provided in the job list data is currently logged in to the printer 10. In Case B, the printer 10 determines that the first user is not logged in to the printer 10 (see FIG. 1C). Thus, the printer 10 discards the job list data without displaying a job list corresponding to the job list data on the display 14. Accordingly, the printer 10 does not perform printing on the basis of the print job J2 which is specified by the job list data at this stage.

Figure 9:
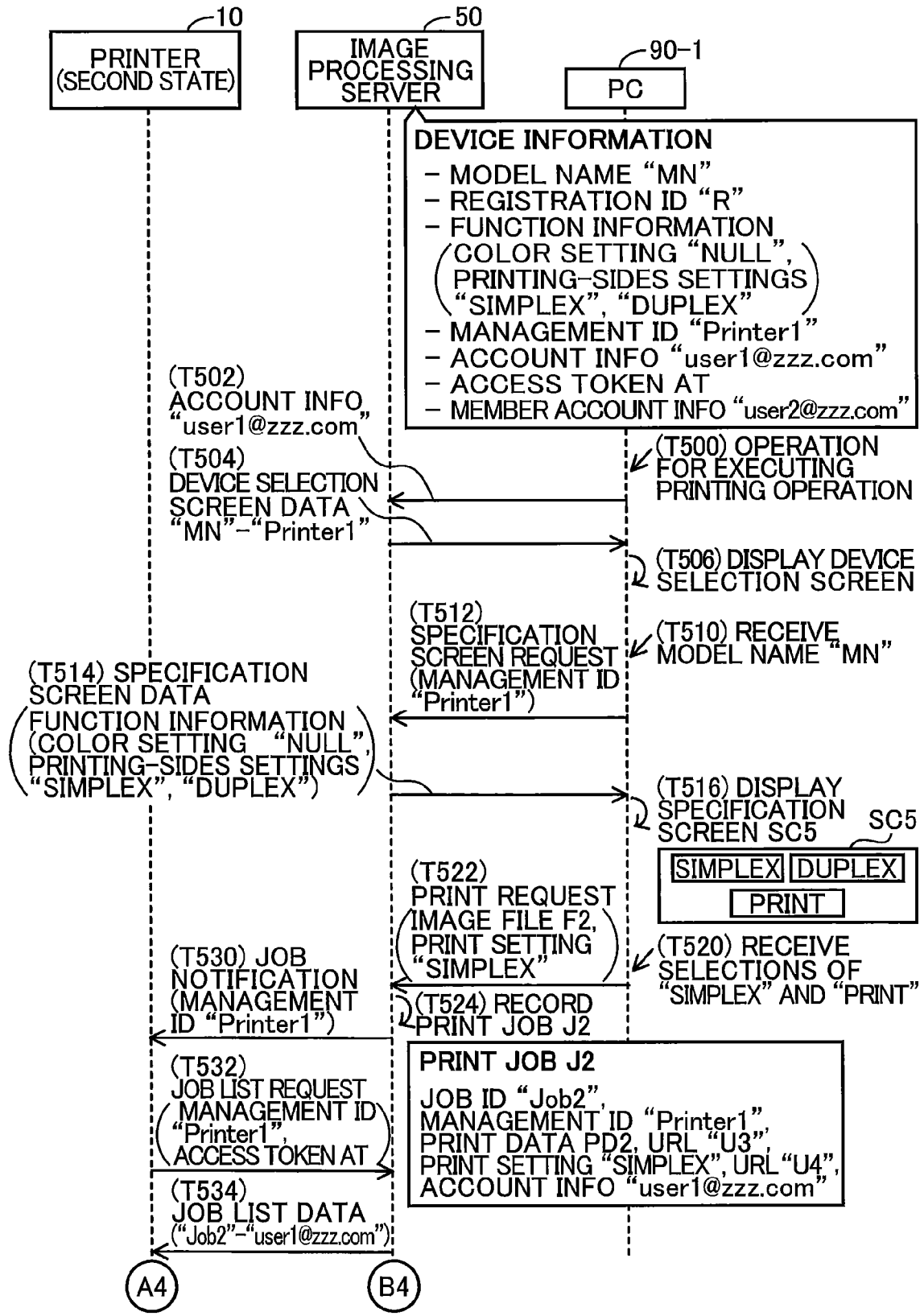
FIG. 9 is a sequence diagram illustrating a first part of a server printing process for executing a printing operation on the printer using the server in Case B according to the first embodiment.
Figure 10:
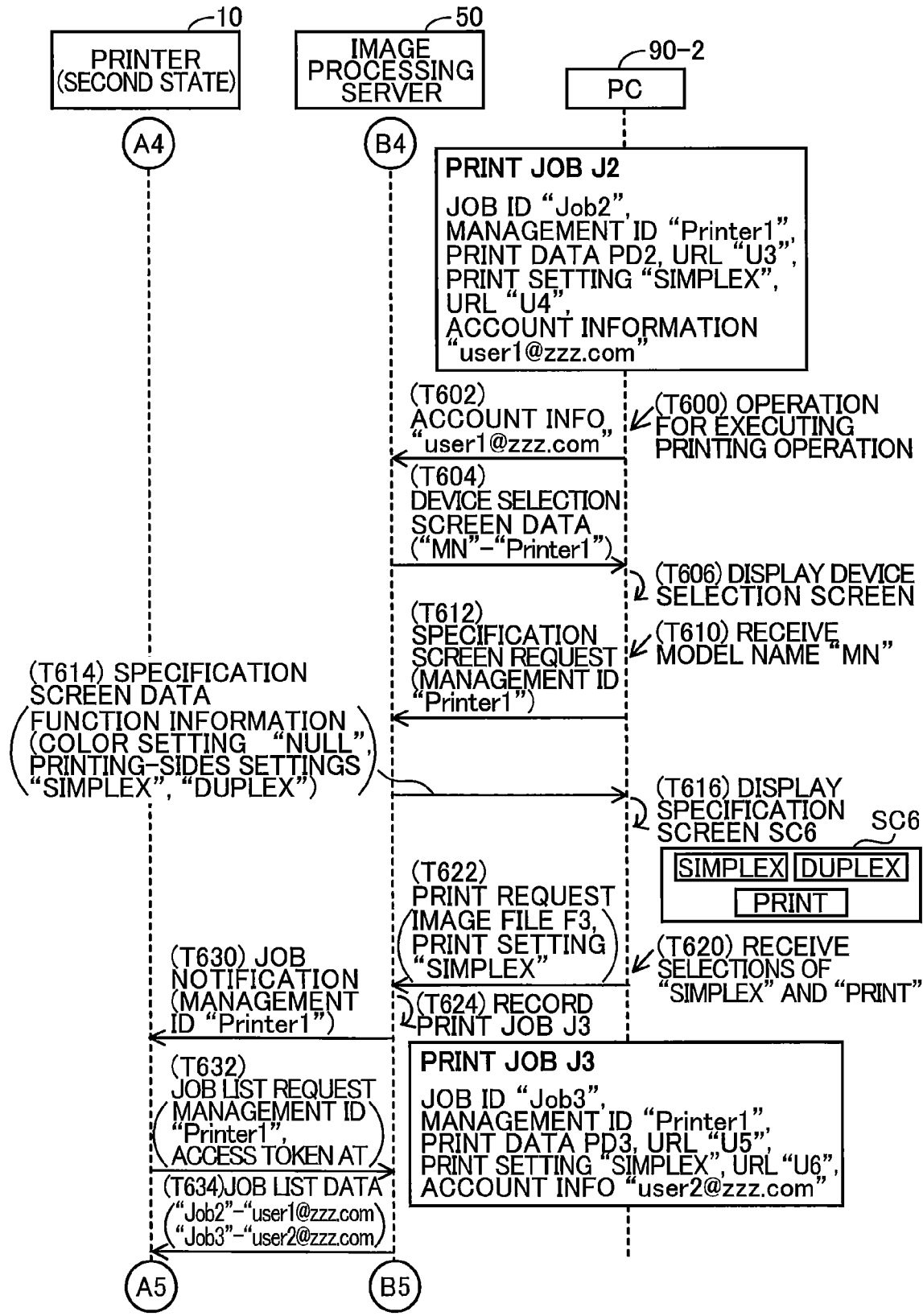
FIG. 10 is a sequence diagram illustrating a second part of the server printing process in Case B according to the first embodiment.

After the process T534 in FIG. 9, as illustrated in FIG. 10, the PC 90-2 executes steps T600 through T614 which are identical to steps T500 through T514 in FIG. 9, except that the PC 90-2 is being used instead of the PC 90-1 and that the account information "user2@zzz.com" is used for the second user. In T616 the PC 90-2 displays a specification screen SC6 represented by the specification screen data. This specification screen SC6 is similar to the specification screen SC5 displayed in T516 of FIG. 9. That is, the specification screen SC6 does not include buttons for specifying values for the color setting. Hence, the second user cannot specify a setting value for the color setting in the specification screen SC6, thereby suppressing the second user from specifying "color" despite the setting "color" not being available to the second user. Accordingly, when the printer 10 is shared by a plurality of users, the printer 10 can be suppressed from executing printing operations based on instructions from certain users when the printing operation includes print settings that the certain users are not allowed to use.

In T620 the PC 90-2 receives a specification for "SIMPLEX" in the specification screen SC6 and a selection of the PRINT button from the second user, and subsequently receives a selection for an image file F3 which is stored in the PC 90-2 for example. After receiving these selections, in T622 the PC 90-2 transmits a print request to the server 50 that includes the image file F3, and the specified print setting (i.e., "SIMPLEX").

Upon receiving the print request from the PC 90-2 in T622, in T624 the server 50 converts the image file F3 to generate print data PD3, generates a job ID "Job3," and records a print job J3 specified by the job ID "Job3." The print job J3 includes the job ID "Job3," the management ID "Printer1," the print data PD3, a URL "U5" specifying the storage location of the print data PD3, the print setting received in T622 (i.e., "SIMPLEX"), a URL "U6" specifying the storage location of the print setting, and the account information "user2@zzz.com."

Steps T630 and T632 are identical to steps T300 and T310 of FIG. 7. In T634 the server 50 identifies the print jobs J2 and J3 including the management ID "Printer1" and transmits job list data to the printer 10. The job list data includes information indicating that the job ID "Job2" and the account information "user1@zzz.com", which are included in the identified print job J2, are correlated with each other, information indicating that the job ID "Job3" and the account information "user2@zzz.com", which are included in the identified print job J3, are correlated with each other.

When the printer 10 receives the job list data from the server 50 in T634, the printer 10 determines that the limitation flag 40 in the memory 34 is set to "ON" and determines that none of the first and second users is logged in to the printer 10 (see FIG. 1C). In this case, the printer 10 discards the job list data without displaying a job list conforming to the job list data on the display 14. That is, the printer 10 does not perform printing on the basis of the print jobs J2 and J3 specified by the job list data at this stage.

Figure 11:
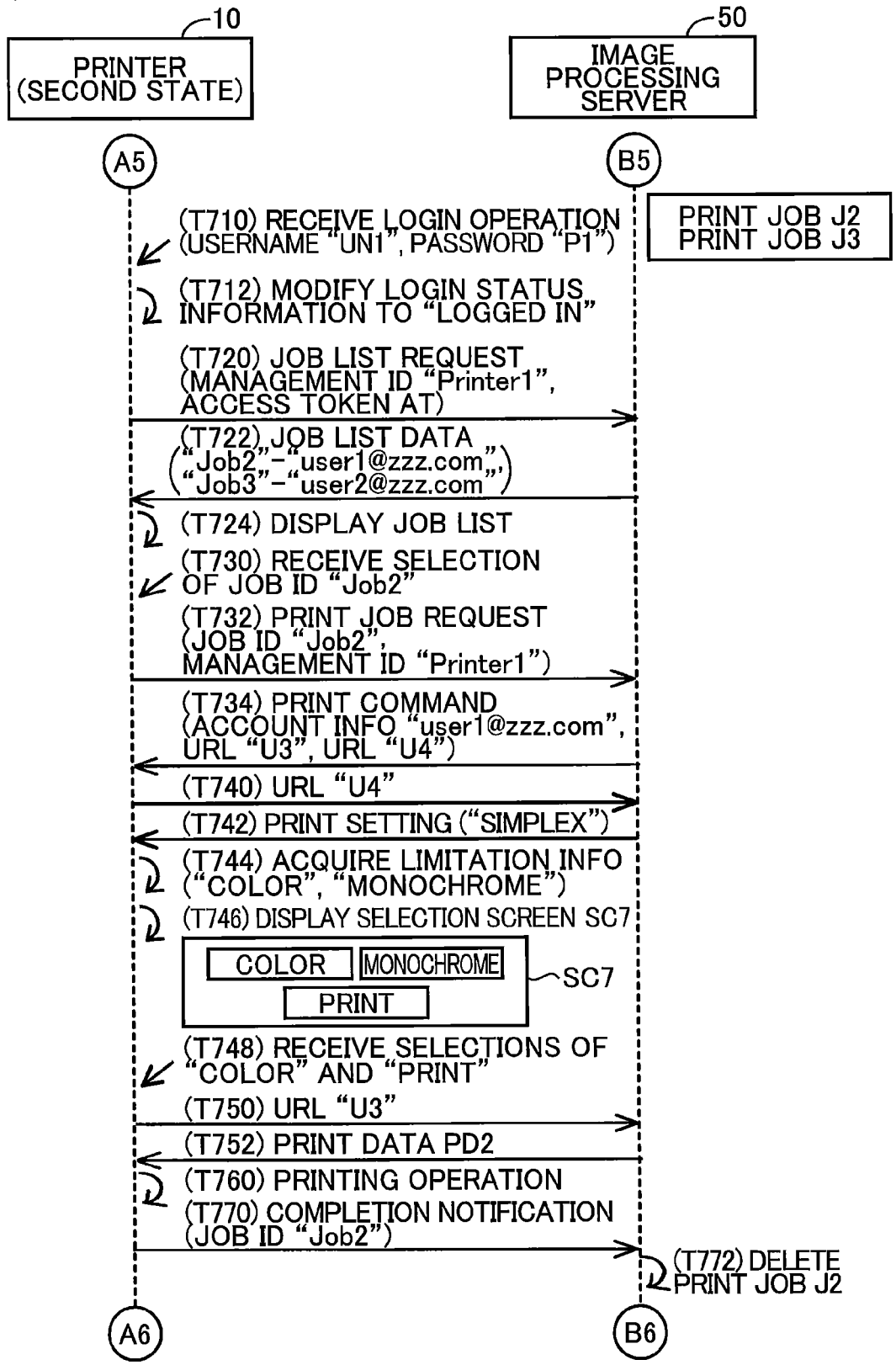
FIG. 11 is a sequence diagram illustrating a third part of the server printing process in Case B according to the first embodiment.

After the process T634 in FIG. 10, as illustrated in FIG. 11, in T710 the printer 10 receives a login operation from the first user that includes input for the username "UN1" and password "P1." After receiving this login operation, in T712 the printer 10 modifies the login information associated with the username "UN1" and password "P1" in the table 38 illustrated in FIG. 1C from "LOGGED OUT" to "LOGGED IN." In this case, in T720 the printer 10 transmits a job list request to the server 50 that includes the management ID "Printer1" and the access token AT.

Step T722 is identical to step T634 of FIG. 10. In this case, job list data transmitted in T722 includes information indicating that the job ID "Job2" and the account information "user1@zzz.com," which are included in the print job J2, are correlated with each other, and information indicating that the job ID "Job3" and the account information "user2@zzz.com," which are included in the print job J3, are correlated with each other. When the printer 10 receives the job list data from the server 50 in T722, the printer 10 determines that the login status information in the table 38 associated with the account information "user1@zzz.com" is "LOGGED IN," i.e., that the first user is currently logged in to the printer 10, and determines that the login status information in the table 38 associated with the account information "user2@zzz.com" is "LOGGED OUT," i.e., that the second user is not currently logged in to the printer 10. In this case, in T724 the printer 10 displays a job list on the display 14 that includes the job ID "Job2" associated with the account information "user1@zzz.com" which is associated with the status information "LOGGED IN," but that does not include the job ID "Job3" associated with the account information "user2@zzz.com" which is associated with the status information "LOGGED OUT."

In T730 the printer 10 receives a selection from the first user for the job ID "Job2" in the job list. Upon receiving this selection, in T732 the printer 10 transmits to the server 50 a print job request that includes the job ID "Job2" and the management ID "Printer1."

Step T734 is identical to step T334 of FIG. 7, except that the account information "user1@zzz.com" and the URLs "U3" and "U4" are used. Next, the printer 10 executes each of the following steps in order to implement a printing operation. Specifically, in T740 the printer 10 first accesses the server 50 using the URL "U4" in the print command and in T742 receives a print setting (i.e., "SIMPLEX") from the server 50. In this case, the printer 10 determines that the setting value for the color setting included in the print settings is not specified, and in T744 acquires the setting values for the color setting (i.e., "COLOR" and "MONOCHROME") from the limitation information provided in the table 38 for the first user associated with the account information "user1@zzz.com" in the print command.

Next, the printer 10 generates selection screen data representing a selection screen in which the user can select any one of the two print settings indicated in the limitation information. In T746 the printer 10 displays the selection screen SC7 represented by this selection screen data on the display 14. This selection screen SC7 includes two buttons for specifying setting values for the color setting (i.e., "COLOR" and "MONOCHROME"), and a PRINT button for executing the printing operation on the printer 10.

In T748 the printer 10 receives selections from the first user in the selection screen SC7, including specifications for "COLOR" and "SIMPLEX" and selection of the PRINT button. Next, in T750 the printer 10 accesses the server 50 using the URL "U3" in the print command and in T752 receives the print data PD2 from the server 50.

In T760 the printer 10 controls the print execution unit 18 to execute a printing operation conforming to the specified print settings (i.e., "COLOR" and "SIMPLEX") and the received print data PD2. Steps T770 and T772 are identical to steps T370 and T372 in FIG. 7, except that the job ID "Job2" is used.

As described above, the printer 10 executes the process beginning from T720 when the first user logs in to the printer 10 (T710). Here, the condition in which the first user is not logged in to the printer 10 denotes a high probability that the first user is in a relatively remote location to the printer 10. In this condition, if the process beginning from T720 were executed so that a job list were displayed on the printer 10, it is possible that a third party other than the first user could select the job ID "Job2" in the job list and execute the same process in T732 through T772. Hence, the third party could take the printed matter. However, in the embodiment the printer 10 only executes the process from T720 when the first user is logged in to the printer 10, i.e., when the first user is relatively close to the printer 10, thereby preventing a third party from taking the printed matter. In a variation, the printer 10 may be configured to execute the process from T720 even when the first user is not logged in to the printer 10.

Figure 12:
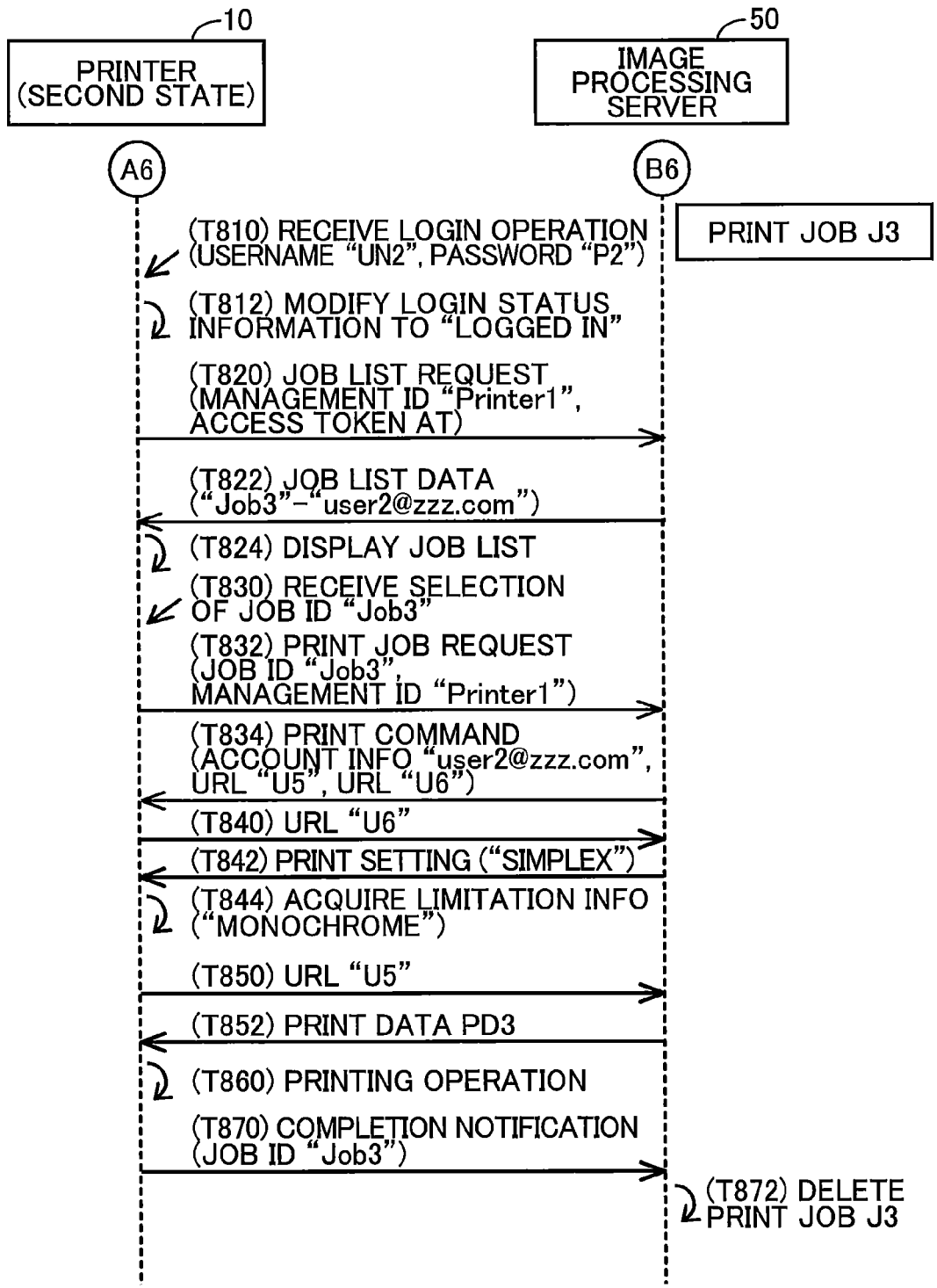
FIG. 12 is a sequence diagram illustrating a final part of the server printing process in Case B according to the first embodiment.

After the process T772 in FIG. 11, as illustrated in FIG. 12, steps T810 through T842 are equivalent to steps T710 through T742 in FIG. 11, except that the username "UN2" and password "P2," job ID "Job3," account information "user2@zzz.com," and URLs "U5" and "U6" are used. When the printer 10 receives print settings from the server 50 in T842, the printer 10 determines that the setting value for the color setting is unspecified and in T844 acquires possible values for the color setting (i.e., "MONOCHROME") from the table 38 in the limitation information for the second user associated with the account information "user2@zzz.com" in the print command. Since only one value is acquired for the color setting in this case, the printer 10 does not display a selection screen (see T746 in FIG. 11) on the display 14 used to select a setting value for the color setting. In T850 the printer 10 uses the URL "U5" in the print command to access the server 50, and in T852 receives the print data PD3 from the server 50.

In T860 the printer 10 controls the print execution unit 18 to execute a printing operation conforming to the specified print settings (i.e., "MONOCHROME" and "SIMPLEX") and the received print data PD3. Steps T870 and T872 are equivalent to steps T370 and T372 in FIG. 7, except that the job ID "Job3" is used. After the printer 10 completes the process in T872, the process of FIG. 12 ends.

As described above, the printer 10 does not display a selection screen on the display 14 for selecting a color setting when determining that the setting value for the color setting has not been specified and when the setting values for the color settings in the limitation information include only one value. Accordingly, the second user need not select a setting value from the selection screen for the color setting, thereby improving user-friendliness. As a variation, the printer 10 may display a selection screen on the display 14 that also includes a button for indicating "MONOCHROME."

<Updating Process>

Next, an updating process for updating function information in the device information recorded on the server 50 will be described with reference to FIG. 13. In T900 of FIG. 13, the printer 10 receives an operation from the administrator of the printer 10 for changing the setting value of the color setting in the limitation information corresponding to the second user in the table 38 from "MONOCHROME" to "COLOR" and "MONOCHROME." As a result, in T902 the printer 10 changes the setting values for the color setting in the limitation information corresponding to the second user to "COLOR" and "MONOCHROME." Consequently, the printer 10 determines that all users are permitted use of two setting values (i.e., "COLOR" and "MONOCHROME") for the color setting, and in T910 transmits an update request to the server 50 for updating function information in the device information recorded on the server 50. The update request includes the access token AT and function information. This function information includes the two values "COLOR" and "MONOCHROME" for the color setting and the two values "SIMPLEX" and "DUPLEX" for the printing-sides setting.

When the server 50 receives the update request from the printer 10 in T910, in T914 the server 50 identifies the device information that includes the access token AT in the update request, and records the function information (i.e., the color settings "COLOR" and "MONOCHROME" and the printing-sides settings "SIMPLEX" and "DUPLEX") included in the update request in place of the function information (i.e., the color setting "NULL" and the printing-sides settings "SIMPLEX" and "DUPLEX") currently stored in the device information. After completing the process in T914, the process of FIG. 13 ends.

As described above, the printer 10 can transmit an update command to the server 50 (T910) in order to update function information in the device information recorded on the server 50 (T914). In this way, the server 50 can transmit specification screen data conforming to the updated function information (i.e., the specification screen data in T214 of FIG. 6) to the PCs 90-1 and the like, enabling the user to specify a desired value for each setting category in the specification screen.

Here, it is possible to imagine a scenario in which the setting value for the color setting in the limitation information of the table 38 corresponding to the second user is modified from "MONOCHROME" to "COLOR." In this case, the printer 10 determines that no users are permitted use of the two setting values for the color setting (i.e., "COLOR" and "MONOCHROME" and does not transmit an update command to the server 50 since there is no need to update the function information in the device information recorded on the server 50. It is also possible to imagine a scenario in which the setting values for the printing-sides setting in the limitation information stored in the table 38 for the first user are modified from "SIMPLEX" and "DUPLEX" to "SIMPLEX." In this case, the printer 10 determines that one of the users is not permitted use of the two setting values for the printing-sides setting (i.e., "SIMPLEX" and "DUPLEX") and transmits an update request to the server 50 that includes function information without including any of the setting values for the color setting or any of the setting values for the printing-sides setting. As a result, the function information in the update request (i.e., the color setting "NULL" and the printing-sides setting "NULL") are stored on the server 50 in place of the function information currently stored in the device information (i.e., the color setting "NULL" and the printing-sides settings "SIMPLEX" and "DUPLEX").

It is also possible to imagine a scenario in which the process of FIGS. 3 and 4 is executed while the limitation flag in the memory 34 is set to "OFF," for example, and that the setting value for the printing-sides setting in the limitation information stored in the table 38 for the first user is modified from "SIMPLEX" and "DUPLEX" to "SIMPLEX" after the printer 10 is registered on the server 50, i.e., after device information including the function information (i.e., the color settings "COLOR" and "MONOCHROME" and the printing-sides settings "SIMPLEX" and "DUPLEX") is recorded on the server 50. In this case, the printer 10 determines that all users are permitted use of the two setting values for the color setting (i.e., "COLOR" and "MONOCHROME") and that no users are permitted use of the two printing-sides settings (i.e., "SIMPLEX" and "DUPLEX"). Thereafter, the printer 10 transmits an update request to the server 50 that includes function information having two setting values for the color setting and no setting values for the printing-sides setting. As a result, the function information in the update request (i.e., the color settings "COLOR" and "MONOCHROME" and the printing-sides setting "NULL") is recorded on the server 50 in place of the function information currently stored in the device information (i.e., the color settings "COLOR" and "MONOCHROME" and the printing-sides settings "SIMPLEX" and "DUPLEX"). In this way, the printer 10 can transmit an update command to the server 50 to update the function information in the device information recorded on the server 50 in accordance with the limitation information in the table 38.

<Processes Performed on the Printer 10>

Next, processes executed by the printer 10 will be described in greater detail with reference to FIGS. 14 and 15. First, detailed steps performed by the printer 10 in the registration process will be described with reference to FIG. 14.

Figure 14:
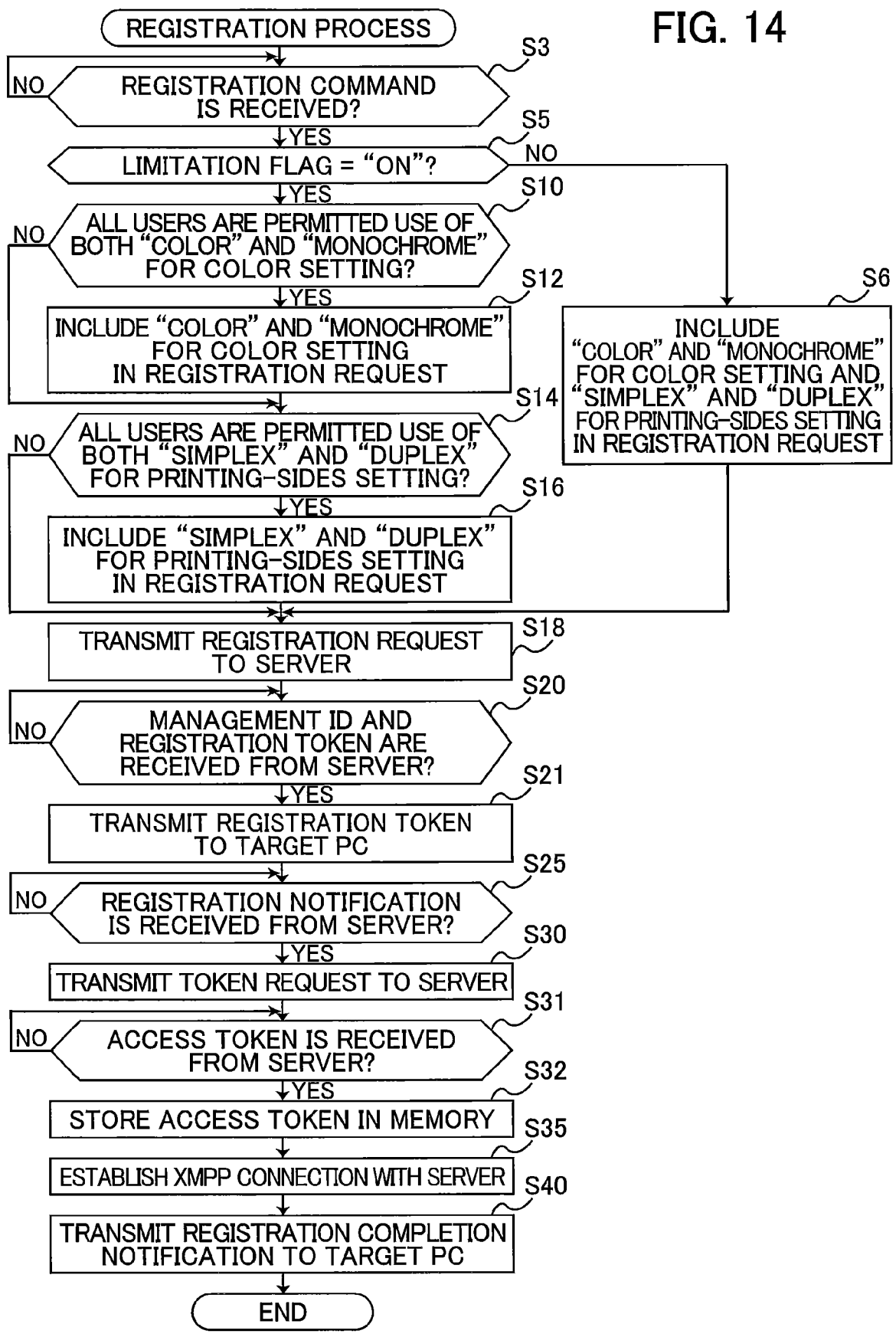
FIG. 14 is a flowchart illustrating steps in the registration process executed by the printer according to the first embodiment.

In S3 of FIG. 14, the printer 10 determines whether a registration command has been received from a PC. When a registration command has not been received (S3: NO), the printer 10 waits to receive a registration command. When a registration command is received from a PC (T32 of FIG. 3, T432 of FIG. 8; S3: YES), the printer 10 advances to S5. Hereinafter, the PC that is the source of the registration command will be called the "target PC."

In S5 the printer 10 determines whether the limitation flag 40 stored in the memory 34 is set to "ON". The printer 10 advances to S10 when determining that the limitation flag 40 is set to "ON" (S5: YES) and advances to S6 when determining that the limitation flag 40 is set to "OFF" (S5: NO).

In S6 the printer 10 adds the two setting values "COLOR! and "MONOCHROME" for the color setting and the two setting values "SIMPLEX" and "DUPLEX" for the printing-sides setting to a registration request. After completing the process in S6, the printer 10 advances to S18.

In S10 the printer 10 uses the limitation information for each user in the table 38 to determine whether all users are permitted the use of both setting values "COLOR" and "MONOCHROME" for the color setting. If the printer 10 determines that all users are permitted use of both setting values for the color setting (S10: YES), in S12 the printer 10 includes the two setting values for the color setting in a registration request. However, if the printer 10 determines that any of the users are not permitted use of both setting values for the color setting (S10: NO), the printer 10 skips S12 and advances directly to S14.

In S14 the printer 10 uses the limitation information for each user in the table 38 to determine whether all users are permitted use of both setting values "SIMPLEX" and "DUPLEX" for the printing-sides setting. If the printer 10 determines that all users are permitted use of both setting values for the printing-sides setting (S14: YES), in S16 the printer 10 includes both setting values for the printing-sides setting in the registration request. However, if the printer 10 determines that any user of the printer 10 is not permitted use of both setting values for the printing-sides setting (S10: NO), the printer 10 skips S16 and advances directly to S18.

In S18 the printer 10 transmits the registration request to the server 50. The registration request includes the model name "MN" of the printer 10, the registration ID "R" preset for the printer 10, and function information. The function information includes the setting values set in S6, S12, and/or S16. For example, if the printer 10 advanced to S18 after performing S6, the function information in the registration request will include both setting values for the color setting and both setting values for the printing-sides setting (T40 of FIG. 3). Alternatively, if the printer 10 advanced to S18 after reaching a NO determination in S10 and a YES determination in S14, the function information in the registration request transmitted in S18 will include both setting values for the printing-sides setting and no setting values for the color setting (T440 of FIG. 8).

In S20 the printer 10 determines whether a management ID and registration token are received from the server 50. When a management ID and registration token have not been received (S20: NO), the printer 10 waits to receive a management ID and registration token. When a management ID and registration token are received (T50 of FIG. 3, T450 of FIG. 8; S20: YES), in S21 the printer 10 transmits this registration token to the target PC (T100 of FIG. 4).

In S25 the printer 10 determines whether a registration notification that includes the registered account information is received from the server 50. When a registration notification has not been received (S25: NO), the printer 10 waits to receive a registration notification. When a registration notification is received (T122 of FIG. 4; S25: YES), in S26 the printer 10 advances to S30.

In S30 the printer 10 transmits a token request to the server 50 (T124 of FIG. 4), and in S31 determines whether an access token is received from the server 50. When an access token has not been received (S31: NO), the printer 10 waits to receive an access token. When the printer 10 receives an access token from the server 50 (T130 of FIG. 4; S31: YES), and in S32 the printer 10 stores this access token in the memory 34.

In S35 the printer 10 transmits a connection request to the server 50 that includes the access token received in S31 (T132 of FIG. 4), and establishes an XMPP connection with the server 50.

In S40 the printer 10 transmits a registration completion notification to the target PC (T136 of FIG. 4). After completing the process of S40, the process in FIG. 14 ends.

<Server Printing Process>

Next, detailed steps performed by the printer 10 in the server printing process will be described with reference to FIG. 15. The process of FIG. 15 is executed when a login operation is received from the user.

Figure 15:
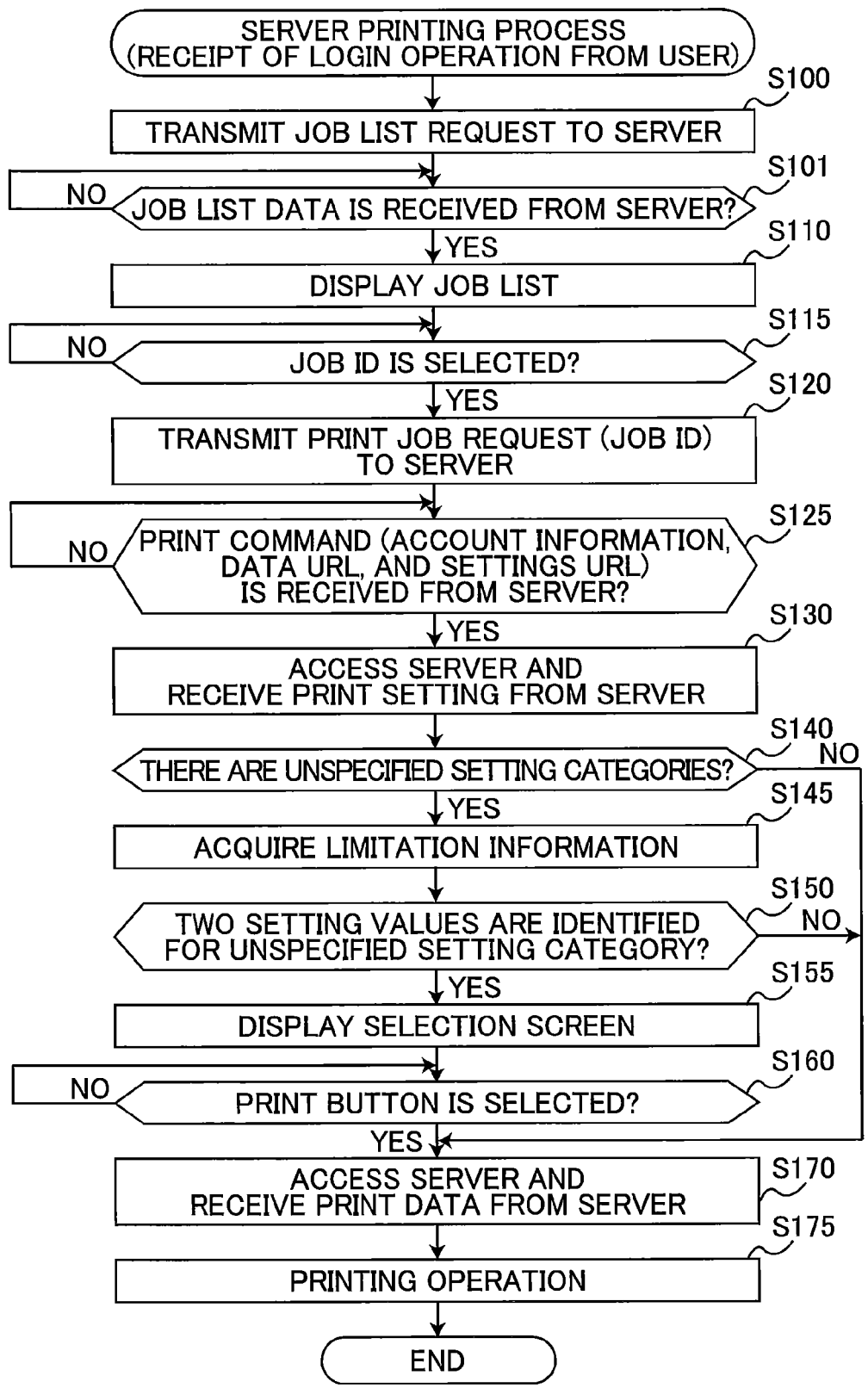
FIG. 15 is a flowchart illustrating steps in the server printing process executed by the printer according to the first embodiment.

In S100 of FIG. 15, the printer 10 transmits a job list request to the server 50 that includes a management ID and an access token (T720 of FIG. 11). In S101 the printer 10 determines whether job list data is received from the server 50. When job list data has not been received (S101: NO), the printer 10 waits to receive job list data. When the printer 10 receives job list data from the server 50 representing a job list (T722; S101: YES), the printer 10 advances to S110. This job list data includes information correlating job IDs and account information.

In S110 the printer 10 identifies account information in the job list data received in S101 that corresponds to users that are logged in to the printer 10 and displays a job list on the display 14 that includes the job IDs associated with this account information (T724 of FIG. 11). In the present embodiment, a plurality of users can be logged in to the printer 10. However, the printer 10 may be configured to accept the login of only one user at a time.

In S115 the printer 10 waits for the user to select a job ID in the job list. Once the user has selected a job ID in the job list (T730 of FIG. 11), the printer 10 reaches a YES determination in S115 and advances to S120.

In S120 the printer 10 transmits a print job request to the server 50 that includes a management ID and the job ID selected in S115 (T732 of FIG. 11).

In S125 the printer 10 determines whether a print command is received from the server 50. When a print command has not been received (S125: NO), the printer 10 waits to receive a print command. When a print command is received from the server 50 (T734 of FIG. 11; S125: YES), the printer 10 advances to S130. The print command includes account information recorded on the server 50 in association with the job ID in the print job request, a URL specifying the storage location of the print data (hereinafter called the "data URL"), and a URL specifying the storage location of the print settings (hereinafter called the "settings URL").

In S130 the printer 10 accesses the server 50 using the settings URL received in S125 and receives the print settings from the server 50 (T742 of FIG. 11).

In S140 the printer 10 determines whether any setting categories in the print settings received in S130 are unspecified. If there are any unspecified setting categories in the print settings, the printer 10 reaches a YES determination in S140 and advances to S145. However, if there are no unspecified setting categories, the printer 10 reaches a NO determination in S140 and advances to S170.

In S145 the printer 10 acquires limitation information from the table 38 for the user associated with the account information in the print command received in S125 and identifies the one or more setting values in the limitation information for the unspecified setting category.

In S150 the printer 10 determines whether two setting values were identified in S145. In other words, the printer 10 determines whether two setting values are set for the single unspecified setting category in the limitation information, that is, whether both setting values are permitted for the unspecified setting category. If the printer 10 determines that two setting values were identified (T744 of FIG. 11; S150: YES), the printer 10 advances to S155. However, if the printer 10 determines that only one setting value was identified (T844 of FIG. 12; S150: NO), the printer 10 skips S155 and S160 and advances directly to S170.

In S155 the printer 10 displays a selection screen on the display 14 for selecting one of the two setting values corresponding to the unspecified setting category (T746 of FIG. 11). The selection screen includes buttons for specifying setting values and a PRINT button for initiating a printing operation on the printer 10.

In S160 the printer 10 waits until the user selects the PRINT button in the selection screen. When the user has selected the PRINT button in the selection screen (S160: YES), the printer 10 advances to S170.

In S170 the printer 10 accesses the server 50 using the data URL in the print command received in S125 and receives print data from the server 50 (T752 of FIG. 11).

In S175 the printer 10 controls the print execution unit 18 to execute a printing operation based on the specified print settings and the received print data (T760). After completing the process of S175, the process in FIG. 15 ends.

Effects of the First Embodiment

In the first embodiment, the printer 10 transmits a registration request to the server 50 that includes function information with two setting values (T40 of FIG. 3) when determining that all users are permitted use of the two setting values "COLOR" and "MONOCHROME" for the color setting (S10: YES of FIG. 14). In this case, the server 50 records the account information ("user1@zzz.com" and "user2@zzz.com") in association with the function information (i.e., the color settings "COLOR" and "MONOCHROME"). Thereafter, when receiving the account information "user2@zzz.com" from the PC 90-2 (T202 of FIG. 6), the server 50 transmits specification screen data to the PC 90-2 for rendering a specification screen that includes buttons for specifying the two setting values for the color setting (T214). Since the PC 90-2 displays a specification screen based on this specification screen data (T216), the user of the PC 90-2 can specify the setting value "COLOR" from among the two setting values for the color setting (T220). Hence, by transmitting a registration request to the server 50 that includes function information with two setting values, the printer 10 can receive a print request from the server 50 that includes the URL "U2" specifying the storage location of the specified print settings ("COLOR" and "SIMPLEX") and can execute a printing operation based on these print settings ("COLOR" and "SIMPLEX"; T360 of FIG. 7). On the other hand, when the printer 10 determines that one user is not permitted use of both setting values for the color setting (S10: NO), the printer 10 transmits a registration request to the server 50 that includes function information without any values for the color setting (T440 of FIG. 8). In this case, the server 50 records the account information ("user1@zzz.com" and "user2@zzz.com") in association with the function information (i.e., the color setting "NULL") and, when receiving the account information "user1@zzz.com" from the PC 90-1 (T502 of FIG. 9), the server 50 transmits specification screen data to the PC 90-1 that represents the specification screen SC5 having no buttons for specifying the setting value of the color setting (T514). Hence, since the PC 90-1 displays the specification screen SC5 conforming to this specification screen data, the user of the PC 90-1 cannot specify a setting value for the color setting. Accordingly, if the printer 10 is shared by a plurality of users, the printer 10 can avoid executing image processes in response to commands from certain users when the print settings for the printing operation include setting values the certain users are not allowed to use.

<Correspondences>

The printer 10 is an example of the image processing apparatus of the present disclosure. The image processing server 50 is an example of the external server of the present disclosure. The PCs 90-1 and 90-2 are examples of the terminal device of the present disclosure. The printing process is an example of the image process of the present disclosure. The print execution unit 18 is an example of the image processing unit of the present disclosure. The color setting and the printing-sides setting are examples of the first setting and the second setting, respectively. The two setting values for the color setting and the two setting values for the printing-sides setting are examples of the M1 number of setting values and the M2 number of setting values, respectively. The memory 34 and the table 38 are examples of the memory of the present disclosure. The limitation information in the table 38 is an example of the setting specification information of the present disclosure. The registration request in T40 of FIG. 3 and the registration request in T440 of FIG. 8 are examples of the first registration request and the second registration request of the present disclosure, respectively. The account information "user1@zzz.com" and "user2@zzz.com" for the first and second users are examples of the account information. The color setting "NULL" and the printing-sides setting "NULL" are examples of the incapability information of the present disclosure.

The specification screen SC4 of T216 in FIG. 6 is an example of the first specification screen of the present disclosure. The specification screen SC5 of T516 in FIG. 9 and the specification screen SC6 of T616 of FIG. 10 are examples of the second specification screen of the present disclosure. The PRINT buttons in the specification screens SC4, SC5, and SC6 are examples of the operation specification area of the present disclosure. The buttons for specifying the setting values corresponding to the color setting are examples of the first setting specification area of the present disclosure. The buttons for specifying the setting values corresponding to the printing-sides setting are examples of the second setting specification area of the present disclosure. The setting value "COLOR" specified in T220 of FIG. 6 is an example of the first setting value of the present disclosure. The print settings "COLOR" and "SIMPLEX" in T342 of FIG. 7 are examples of the first setting of the present disclosure. The setting value "COLOR" specified in T748 of FIG. 11 is an example of the second setting value of the present disclosure. The setting value "SIMPLEX" specified in T520 of FIG. 9 or T620 of FIG. 10 is an example of the third setting value of the present disclosure. The "SIMPLEX" of the print setting in T742 of FIG. 11 or T842 of FIG. 12 is an example of the second setting of the present disclosure. The print request of T222 in FIG. 6 is an example of the first function execution request of the present disclosure. The print request of T522 in FIG. 9 or T622 in FIG. 10 is an example of the second function execution request of the present disclosure. The URL "U2" is an example of the first information. The URL "U4" and the URL "U6" are examples of the second information. The print command of T334 in FIG. 7 is an example of the first function execution instruction of the present disclosure. The print command of T734 in FIG. 11 and the print command of T834 in FIG. 12 are examples of the second function execution instruction of the present disclosure. The user-name and password are examples of the user identification information of the present disclosure. The print data is an example of the image data of the present disclosure. The state in which the limitation flag 40 is set to "ON" is an example of the first mode of the present disclosure. The state in which the limitation flag 40 is set to "OFF" is an example of the second mode of the present disclosure.

Figure 8:
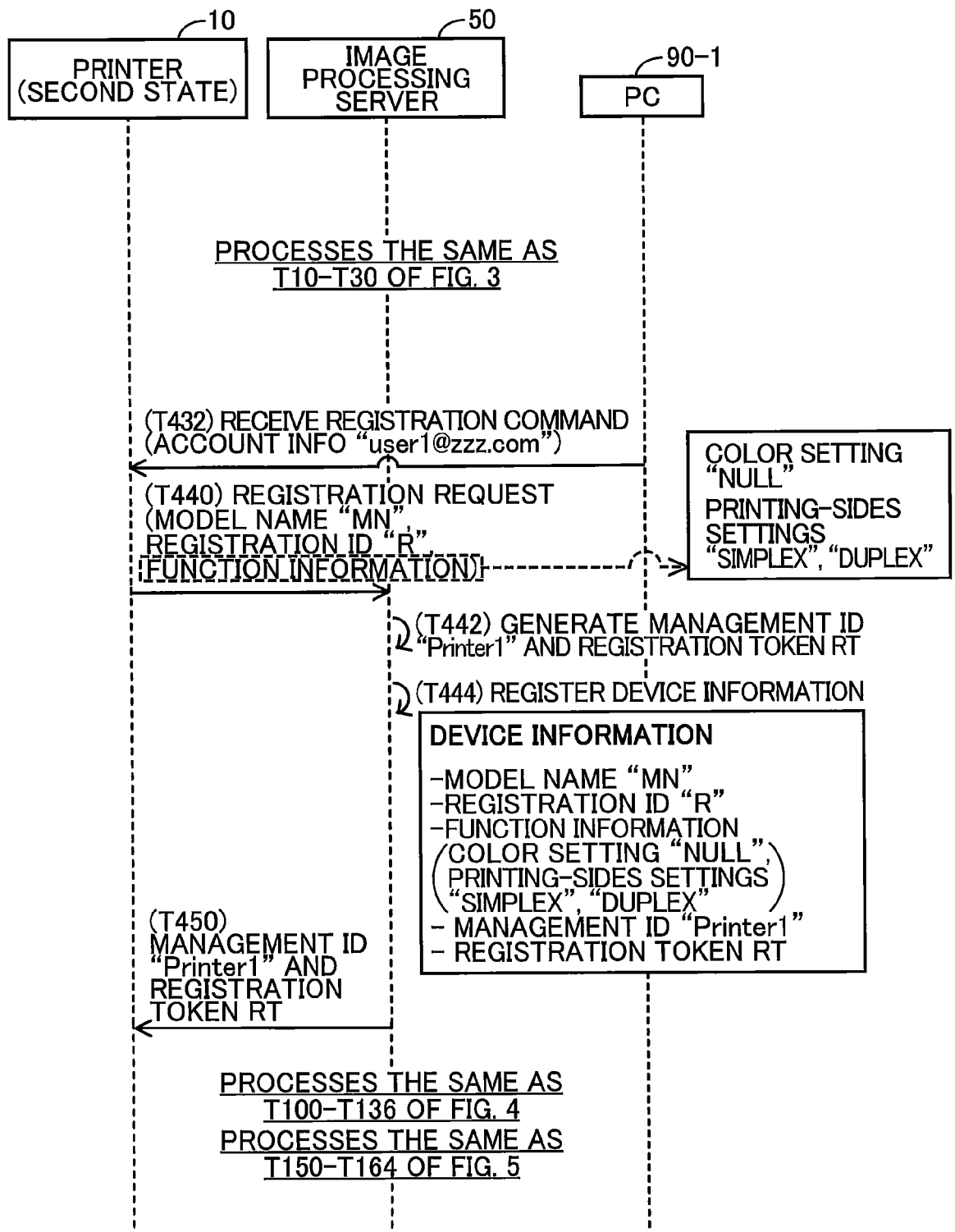
FIG. 8 is a sequence diagram illustrating a registration process for registering the printer on the server in Case B according to the first embodiment.

The process of T32 in FIG. 3 and the process of T432 in FIG. 8 are examples of the (a) receiving of the present disclosure. The process of S10 of FIG. 14 and the process of S14 of FIG. 14 are examples of the (b) determining of the present disclosure. The process of T40 in FIG. 3 is an example of the (c1) transmitting of the present disclosure. The process of T334 in FIG. 7 is an example of the (d1) receiving of the present disclosure. The process of T360 in FIG. 7 is an example of the (e1) controlling of the present disclosure. The process of T440 in FIG. 8 is an example of the (c2) receiving of the present disclosure. The process of T734 in FIG. 11 and the process of T834 in FIG. 12 are examples of the (d2) receiving of the present disclosure. The process of T760 in FIG. 11 and the process of T860 in FIG. 12 are examples of the (e2) controlling of the present disclosure.

Second Embodiment

Figure 16:
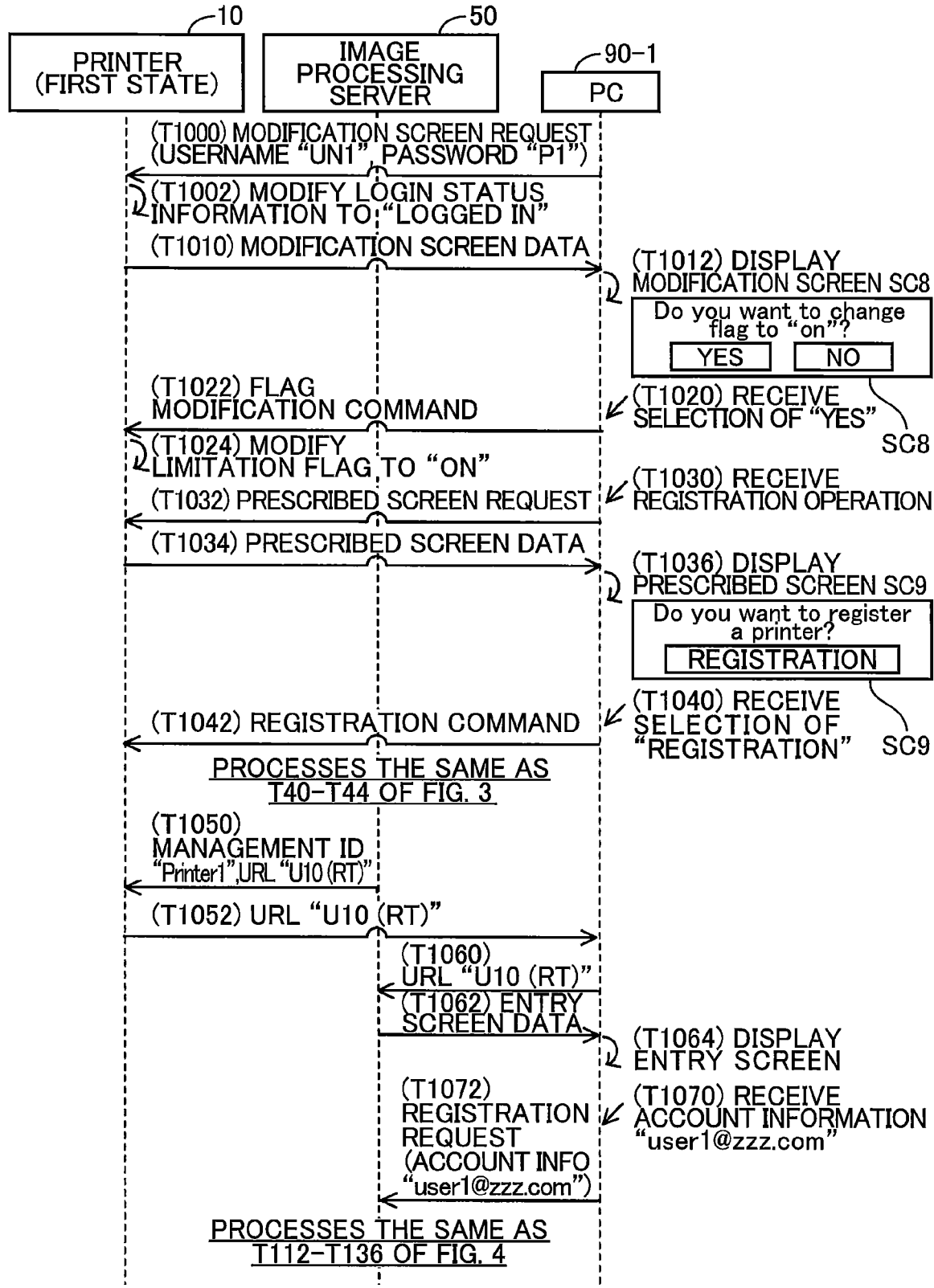
FIG. 16 is a sequence diagram illustrating a registration process for registering a printer on a server according to a second embodiment.

Next, a second embodiment of the present disclosure will be described with reference to FIG. 16. In the second embodiment, the printer 10 is provided with a web server function and can receive instructions for the server from a PC or another external device. The registration process of FIG. 16 is executed in the second embodiment in place of the registration process of FIG. 3 described in the first embodiment. In the initial state of FIG. 16, the limitation flag 40 of the printer 10 is set to "OFF." In other words, the printer 10 is in the first state.

When the PC 90-1 receives a command from the first user to modify the limitation flag 40 from "OFF" to "ON" in the printer 10, in T1000 of FIG. 14 the PC 90-1 transmits a modification screen request to the printer 10. The modification screen request requests a modification screen for changing the limitation flag 40, and includes the username "UN1" and the password "P1."

When the printer 10 receives the modification screen request from the PC 90-1 in T1000, in T1002 the printer 10 changes the login status information in the table 38 associated with the username "UN1" included in the modification screen request from "LOGGED OUT" to "LOGGED IN." In T1010 the printer 10 transmits modification screen data representing a modification screen SC8 to the PC 90-1.

After the PC 90-1 receives the modification screen data from the printer 10 in T1010, in T1012 the PC 90-1 displays the modification screen SC8 represented by the modification screen data. The modification screen SC8 includes a YES button for changing the limitation flag 40 to "ON," and a NO button for not changing the limitation flag 40.

In T1020 the PC 90-1 receives a selection for the YES button in the modification screen SC8 from the first user, and in T1022 transmits a flag modification command to the printer 10. The flag modification command instructs the printer 10 to change the limitation flag 40 from "OFF" to "ON."

When the printer 10 receives the flag modification command from the PC 90-1 in T1022, in T1024 the printer 10 modifies the limitation flag 40 in the memory 34 from "OFF" to "ON."

In T1030 the PC 90-1 receives a registration operation from the first user for registering the printer 10 on the server 50. In response, in T1032 the PC 90-1 transmits a prescribed screen request to the printer 10. The prescribed screen request requests the printer 10 to transmit a prescribed screen. In the second embodiment, the first user does not log in to the server 50.

Upon receiving this prescribed screen request from the PC 90-1 in T1032, in T1034 the printer 10 transmits prescribed screen data representing a prescribed screen SC9 to the PC 90-1. The prescribed screen SC9 includes a REGISTER button.

After receiving the prescribed screen data from the printer 10 in T1034, in T1036 the PC 90-1 displays the prescribed screen SC9 represented by the prescribed screen data. When the first user selects the REGISTER button in the prescribed screen SC9 in T1040, in T1042 the PC 90-1 transmits a registration command to the printer 10. The registration command does not include the account information "user1@zzz.com" for the first user. Thereafter, the same process described in T40 through T44 of FIG. 3 is executed.

In T1050 the server 50 transmits the management ID "Printer1" and a URL "U10" to the printer 10. The URL "U10" is location information specifying a location on the server 50 and includes the registration token RT as a query string.

When the printer 10 receives the management ID "Printer1" and the URL "U10" from the server 50 in T1050, in T1052 the printer 10 transmits the URL "U10" to the PC 90-1.

After receiving the URL "U10" from the printer 10 in T1052, in T1060 the PC 90-1 transmits the URL "U10" to the server 50 to access the server 50.

When the server 50 receives the URL "U10" from the PC 90-1 in T1060, the server 50 determines whether the registration token RT included in the URL "U10" matches the registration token RT included in the device information (see T44 of FIG. 3). Since the registration tokens match in this case, in T1062 the server 50 transmits entry screen data to the PC 90-1 representing an entry screen for inputting account information.

Upon receiving the entry screen data from the server 50 in T1062, in T1064 the PC 90-1 displays the entry screen (not illustrated). When the PC 90-1 receives input of the account information "user1@zzz.com" via the entry screen from the first user in T1070, in T1072 the PC 90-1 transmits a registration request to the server 50 that includes the account information "user1 @zzz.com". Thereafter, the same process described in T112 through T136 of FIG. 4 is executed, thereby completing the process for registering the printer 10 on the server 50.

Effects of the Second Embodiment

According to the second embodiment described above, the PC 90-1 transmits the registration command to the printer 10 after the first user performs the registration operation and selects the REGISTER button on the PC 90-1. With this method, the PC 90-1 need not search for the printer 10, and the first user need not select the device name "DN" of the printer 10 from among a plurality of device names displayed in the search results, thereby improving user-friendliness.

While the description has been made in detail with reference to specific embodiments, it would be apparent to those skilled in the art that various changes and modifications may be made thereto.

<First Variation>

In the first embodiment described above, the limitation information stored in the table 38 specifies one or more setting values for each of the two setting categories (i.e., the color setting and printing-sides setting) that the corresponding user is permitted to use. However, the limitation information may instead specify one or more setting values that the corresponding user is not permitted to use. In this case, for example, when the printer is in the second state illustrated in FIG. 1C, the limitation information for the first user does not include any setting values for the color setting or the printing-sides setting. In addition, the limitation information for the second user includes only the single value "COLOR" for the color setting. In other words, the "setting specification information" of the present disclosure may be information for specifying one or more setting values for at least one setting category that the corresponding user is permitted to use.

<Second Variation>

The table 38 may be stored on an external server rather than the printer 10. In this variation, for example, in T744 of FIG. 11 the printer 10 transmits the account information "user1@zzz.com" included in the print command to the external server. When the external server receives the account information "user1@zzz.com" from the printer 10, the external server identifies the limitation information associated with the account information (i.e., "COLOR" and "MONOCHROME, and "SIMPLEX" and "DUPLEX") and transmits this limitation information to the printer 10. In this way, the printer 10 can acquire the limitation information corresponding to the first user. In other words, the "memory" of the present disclosure may be provided in a device separate from the "image processing apparatus" of the present disclosure.

<Third Variation>

The limitation flag 40 may be set to "ON" at all times. In this variation, the "(k) transmitting" (transmitting a third registration request) of the present disclosure may be omitted.

<Fourth Variation>

As a fourth variation, rather than determining whether the limitation flag 40 in the memory 34 is set to "ON" in S5 of FIG. 14, the printer 10 may determine whether limitation information is stored in the table 38. In this case, the printer 10 advances to S10 when determining that limitation information is stored in the table 38 (S5: YES) and advances to S6 when determining that limitation information is not stored in the table 38 (S5: NO). In this variation, the state of limitation information being stored and the state of limitation information not being stored are examples of the "first mode" and the "second mode" of the present disclosure, respectively.

<Fifth Variation>

In T334 of FIG. 7, the printer 10 may receive from the server 50 a print command that includes the print data PD1 and the print settings ("COLOR" and "SIMPLEX") rather than the URLs "U1" and "U2," for example. In this variation, the print setting is an example of the first information and the second information of the present disclosure.

<Sixth Variation>

In S10 of FIG. 14, the printer 10 may use the limitation information in the table 38 to determine whether all users of the printer 10 are permitted use of any one of the two values "COLOR" and "MONOCHROME" for the color setting. Similarly, in S14 the printer 10 may use the limitation information to determine whether all users of the printer 10 are permitted use of any one of the two setting values "SIMPLEX" and "DUPLEX" for the printing-sides setting. In this case, in T440 of FIG. 8 the printer 10 transmits a registration request to the server 50 that includes function information having the single setting value "MONOCHROME" for the color setting and the two setting values "SIMPLEX" and "DUPLEX" for the printing-sides setting, for example. Since the device information recorded on the server 50 includes this function information, in T616 of FIG. 10 the PC 90-2 displays a specification screen that further includes a button for specifying the setting value "MONOCHROME" for the color setting, for example. This configuration can prevent the second user from specifying the setting value "COLOR" for the color setting in the specification screen. Further, since an unspecified setting category does not occur in the print settings in this variation, the printer 10 never make a YES determination in S140 of FIG. 15 and, hence, need not display the selection screen SC7, thereby reducing the processing load on the printer 10. In the present variation, the "(g) controlling" (displaying a selection screen) of the present disclosure may be omitted.

<Seventh Variation>

The printer 10 may execute the process in T744 through T748 prior to executing the process in T740 and T742 of FIG. 11, for example. In this case, after transmitting a registration request to the server 50 in T440 of FIG. 8, the printer 10 stores transmission information in the memory 34 indicating that two setting values for the printing-sides setting have been transmitted to the server 50. Accordingly, since the printer 10 stores the transmission information in the memory 34 when receiving a print command from the server 50 in T734, the printer 10 determines that the two setting values for the color setting were not transmitted to the server 50 and displays the selection screen SC7 on the display 14 that includes buttons for specifying setting values for the color setting. After subsequently receiving a specification for "COLOR" and a selection of the PRINT button in the selection screen SC7 from the first user, the printer 10 uses the URL "U4" received in the print command to obtain the print setting ("SIMPLEX") from the server 50.

<Eighth Variation>

When the printer 10 receives a print command from the server 50 in T734 of FIG. 11, the printer 10 may execute the process in T750 and T752 prior to executing the process in T740 through T748. In other words, the (i) receiving (receiving image data) of the present disclosure may receive image data from the server prior to the user selecting a second setting value in the selection screen.

<Ninth Variation>

In T720 of FIG. 11, the printer 10 may transmit to the server 50 a job list request that further includes the account information "user1@zzz.com" associated with the username "UN1" and the password "P1" in the table 38. In this case, upon receiving the job list request from the printer 10, the server 50 identifies the print job J2 that includes this account information "user1 @zzz.com," and transmits the job list data to the printer 10. The job list data received in T824 includes only information correlating the job ID "Job2" included in the print job J2 with the account information "user1@zzz.com". Upon receiving the job list data from the server 50, the printer 10 displays the job list represented by the job list data on the display 14.

<Tenth Variation>

Figure 13:
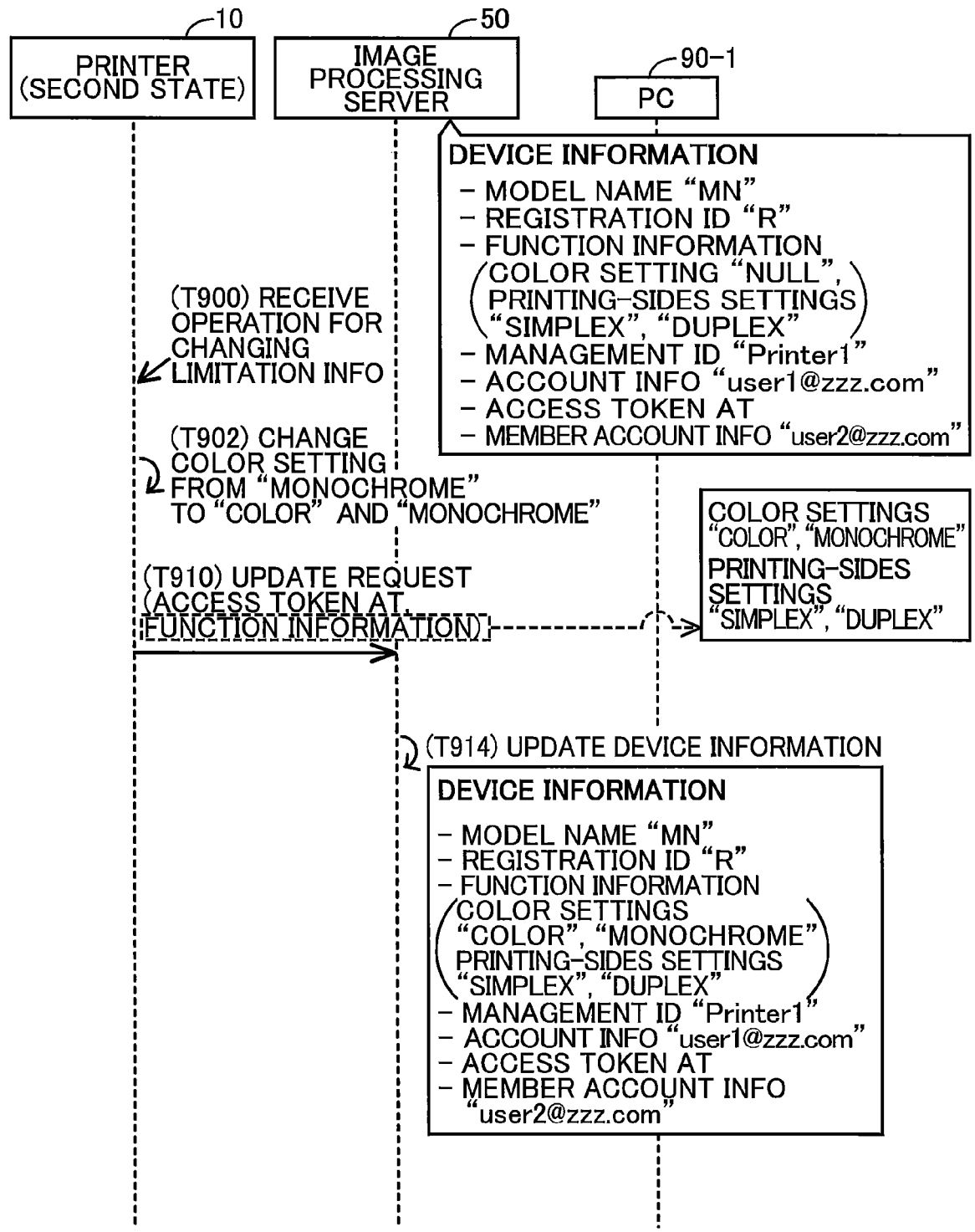
FIG. 13 is a sequence diagram illustrating an update process for updating function information in device information recorded on the server according to the first embodiment.

As a tenth variation, the updating process of FIG. 13 may be omitted. In the present variation, the "(j) transmitting" (transmitting an update request) of the present disclosure may be omitted.

<Eleventh Variation>

The image processing apparatus is not limited to the printer 10, but may be any apparatus (a multifunction peripheral, for example) that can execute processes in addition to a printing process (a scanning process, for example).

Alternatively, the image processing apparatus may be a scanner that can only execute scanning processes. In the latter case, the server 50 may mediate scanning operations between the scanner and the PCs 90-1 and the like. As an example, one of the scan setting categories may be the color setting, and possible setting values for the color setting may be "COLOR" and "MONOCHROME." The setting value "COLOR" indicates that the user is permitted to perform color scans, while the value "MONOCHROME" indicates that the user is permitted to perform monochrome scans. In this case, in T440 of FIG. 8 the scanner transmits a registration request to the server 50 that includes function information without any setting values for the color setting. As a result, the specification screen SC5 displayed in T516 of FIG. 9 does not include any buttons specifying setting values for the color setting. Upon receiving a scan request from the PC 90-1 that includes scan settings without any setting values for the color setting, the server 50 transmits a scan command to the scanner that includes the account information "user1 @zzz.com" and the scan settings in place of performing the process in T530 through T534 of FIG. 9 described in the embodiments. As a result, the scanner determines that the setting value for the color setting is unspecified, acquires limitation information from the table 38 for the first user associated with the account information "user1@zzz.com," and displays a selection screen for selecting a setting value for the color setting. When the scanner receives a specification from the first user in the selection screen for the setting value "COLOR," for example, the scanner executes a color scanning operation based on the value "COLOR" and transmits the resulting scan data to the server 50. In this case, the server 50 transmits the scan data to the PC 90-1. In the present variation, the scan process is an example of the "image process" of the present disclosure.

<Twelfth Variation>

In the embodiments described above, each of the processes in FIGS. 2 through 16 are implemented in software (i.e., the program 36), but one or more of these processes may be implemented in hardware configured of logic circuits and the like.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. An image processing apparatus comprising:
an image processing unit;
a display; and
a controller configured to perform:
(a) receiving a registration instruction for registering information on the image processing apparatus to an external server;
(b) determining, in response to receiving the registration instruction, whether (b1) all of a plurality of users is permitted to use all of a plurality of setting values for each of at least one setting category, or (b2) any of the plurality of users is not permitted to use all of the plurality of setting values for each of the at least one setting category, the at least one setting category being used for an image process and including a first setting category having an M1 number of setting values, M1 being an integer greater than or equal to two, the (b) determining being made using setting specification information stored in a memory for each of the plurality of users, the setting specification information being stored in the memory in association with account information of corresponding one of the plurality of users, the setting specification information specifying, for each of the at least one setting category, at least one setting value among the plurality of setting values that is permitted to use for the image process by the each of the plurality of users;
(c1) transmitting, in response to determining in (b) that all of the plurality of users is permitted to use all of the M1 number of setting values for the first setting category, to the external server a first registration request including the M1 number of setting values, the external server being configured to store the M1 number of setting values in association with specific account information corresponding to a specific user in response to receiving the first registration request from the image processing apparatus, the external server being configured to transmit first specification screen data to a terminal device in response to receiving the specific account information from the terminal device, the first specification screen data being generated on the basis of the M1 number of setting values included in the first registration request so that the first specification screen data represents a first specification screen including an operation specification area and a first setting specification area, the operation specification area being for receiving an instructing operation to instruct the image processing apparatus to execute the image process, the first setting specification area being for receiving a first specifying operation to specify one of the M1 number of setting values for the first setting category;
(d1) receiving a first function execution instruction including first information from the external server, the terminal device being configured to transmit to the external server a first function execution request including a first setting value for the first setting category in response to receiving the first specifying operation to specify the first setting value from among the M1 number of setting values and the instructing operation while displaying the first specification screen, the first information being related to the first setting value being specified for the first setting category, the first function execution instruction being received after the first function execution request is transmitted from the terminal device to the external server;
(e1) controlling, in response to receiving the first function execution instruction, the image processing unit to execute the image process in accordance with a first setting including the first setting value for the first setting category;
(c2) transmitting, in response to determining in (b) that any of the plurality of users is not permitted to use all of the M1 number of setting values for the first setting category, to the external server a second registration request not including the M1 number of setting values, the external server being configured to store incapability information in association with the specific account information in response to receiving the second registration request from the image processing apparatus, the incapability information indicating that at least one of the M1 number of setting values is not permitted to be specified, the external server being configured to transmit second specification screen data to the terminal device in response to receiving the specific account information from the terminal device, the second specification screen data being generated on the basis of the incapability information so that the second specification screen data represents a second specification screen including the operation specification area and excluding the first setting specification area, wherein excluding the first setting specification area includes excluding the M1 number of setting values for the first setting category such that the M1 number of setting values are not visible on the second specification screen;

(d2) receiving a second function execution instruction from the external server, the second function execution instruction including second information being related to none of the M1 number of setting values being specified for the first setting category, the second function execution instruction further including the specific account information, the terminal device being configured to transmit to the external server a second function execution request not including the M1 number of setting values for the first setting category in response to receiving the instruction operation while displaying the second specification screen, the second function execution instruction being received after the second function execution request is transmitted from the terminal device to the external server;

(f) acquiring, in response to receiving the second function execution instruction, from the memory specific setting specification information associated with the specific account information included in the second function execution instruction, the specific setting specification information being the setting specification information corresponding to the specific user and specifying at least one setting value for the first setting category;

(g) controlling the display to display a selection screen including a first setting selection area for receiving a first selecting operation to select one of the at least one setting value for the first setting category; and (e2) controlling, in response to receiving the second function execution instruction, and in response to receiving the first selecting operation to select a second setting value for the first setting category while the selection screen is displayed on the display, the image processing unit to execute the image process in accordance with a second setting including the second setting value for the first setting category.

2. The image processing apparatus according to claim 1, wherein the at least one setting category further includes a second setting category having an M2 number of setting values, M2 being an integer greater than or equal to two, wherein the (c2) transmitting transmits, in response to determining in (b) that any of the plurality of users is not permitted to use all of the M1 number of setting values for the first setting category and that all of the plurality of users is permitted to use all of the M2 number of setting values for the second setting category, the second registration request including none of the M1 number of setting values and all of the M2 number of setting values to the external server, wherein the external server stores the incapability information and the M2 number of setting values in association with the specific account information in response to receiving the second registration request from the image processing apparatus, and transmits the second specification screen data to the terminal device in response to receiving the specific account information from the terminal device, the second specification screen data being generated on the basis of the incapability information and the M2 number of setting values so that the second specification screen data represents the second specification screen including the operation specification area, excluding the first setting specification area, and including a second setting specification area, the second setting specification area being for receiving a second specifying operation to specify one of the M2 number of setting values for the second setting category, wherein the (d2) receiving receives the second function execution instruction from the external server after the second function execution request is transmitted from the terminal device to the external server, the second function execution request including none of the M1 number of setting values for the first setting category and a third setting value for the second setting category, the terminal device transmitting the second function execution request to the external server in response to receiving the second specifying operation to specify the third setting value from among the M2 number of setting values and the instructing operation while displaying the second specification screen, the second function execution instruction including the second information being related to none of the M1 number of setting values being specified for the first setting category and the third setting value is specified for the second setting category, wherein the selecting screen excludes a second setting selection area for receiving a second selecting operation to select one of the M2 number of setting values for the second setting category, and wherein the (e2) controlling controls, in response to receiving the first selecting operation while the selection screen is displayed on the display, the image processing unit to execute the image process in accordance with the second setting including the second setting value for the first setting category and the third setting value for the second setting category.

3. The image processing apparatus according to claim 1, wherein in a case where the specific setting specification information specifies two or more setting values for the first setting category, the (g) controlling controls the display to display the selection screen including the first setting selection area, and wherein in a case where the specific setting specification information specifies one setting value for the first setting category, the (g) controlling controls the display not to display the selection screen and the (e2) controlling controls the image processing unit to execute the image process unit in accordance with the second setting including the one setting value for the first setting category.

4. The image processing apparatus according to claim 1, further comprising an operation interface, wherein the controller is configured to further perform (h) receiving via the operation interface an input of user identification information for identifying the specific user, wherein the (g) controlling controls the display not to display the selection screen before the (h) receiving is performed, and wherein the (g) controlling controls the display to display the selection screen after the (h) receiving is performed.

5. The image processing apparatus according to claim 1, wherein the controller is configured to further perform (i) receiving image data from the external server, the image process being a print process to print an image based on the image data, wherein the (e1) controlling controls the image processing unit to execute the print process in accordance with the first setting in a case where the (d1) receiving receives the first function execution instruction from the external server and the (i) receiving receives the image data from the external server, and wherein the (e2) controlling controls the image processing unit to execute the print process in accordance with the second setting in a case where the (d2) receiving receives the second function execution instruction from the external server and the (i) receiving receives the image data from the external server.

6. The image processing apparatus according to claim 5, wherein the (i) receiving is performed after the first selecting operation is received.

7. The image processing apparatus according to claim 1, wherein the controller is configured to further perform (j) transmitting an update request to the external server in a case where the image processing apparatus transit from a first state to a second state due to update of the setting specification information stored in the memory after the (c2) transmitting is performed, any of the plurality of users being not permitted to use all of the M1 number of setting values for the first setting category in the first state, all of the plurality of users being permitted to use all of the M1 number of setting values for the first setting category in the second state, the update request including the M1 number of setting values and requesting the server to replace the incapability information with the M1 number of setting values.

8. The image processing apparatus according to claim 1, wherein the (b) determining is performed in response to receiving the registration instruction in (a) while the image processing apparatus is placed in a first mode in which the setting specification information is used, and wherein the controller is configured to further perform (k) transmitting a third registration request to the external server in response to receiving the registration instruction in (a) while the image processing apparatus is placed in a second mode in which the setting specification information is not used, the third registration request including the plurality of setting values for each of the at least one setting category.

9. The image processing apparatus according to claim 1, wherein the memory is a component of the controller.

10. A non-transitory computer readable storage medium storing a set of program instructions for an image processing apparatus including an image processing unit, the set of program instructions comprising:

(a) receiving a registration instruction for registering information on the image processing apparatus to an external server;

(b) determining, in response to receiving the registration instruction, whether (b1) all of a plurality of users is permitted to use all of a plurality of setting values for each of at least one setting category, or (b2) any of the plurality of users is not permitted to use all of the plurality of setting values for each of the at least one setting category, the at least one setting category being used for an image process and including a first setting category having an M1 number of setting values, M1 being an integer greater than or equal to two, the (b) determining being made using setting specification information stored in a memory for each of the plurality of users, the setting specification information being stored in the memory in association with account information of corresponding one of the plurality of users, the setting specification information specifying, for each of the at least one setting category, at least one setting value among the plurality of setting values that the each of the plurality of users is permitted to use for the image process;

(c1) transmitting, in response to determining in (b) that all of the plurality of users is permitted to use all of the M1 number of setting values for the first setting category, to the external server a first registration request including the M1 number of setting values, the external server being configured to store the M1 number of setting values in association with specific account information corresponding to a specific user in response to receiving the first registration request from the image processing apparatus, the external server being configured to transmit first specification screen data to a terminal device in response to receiving the specific account information from the terminal device, the first specification screen data being generated on the basis of the M1 number of setting values included in the first registration request so that the first specification screen data represents a first specification screen including an operation specification area and a first setting specification area, the operation specification area being for receiving an instructing operation to instruct the image processing apparatus to execute the image process, the first setting specification area being for receiving a first specifying operation to specify one of the M1 number of setting values for the first setting category;

(d1) receiving a first function execution instruction including first information from the external server, the terminal device being configured to transmit to the external server a first function execution request including a first setting value for the first setting category in response to receiving the first specifying operation to specify the first setting value from among the M1 number of setting values and the instructing operation while displaying the first specification screen, the first information being related to the first setting value being specified for the first setting category, the first function execution instruction being received after the first function execution request is transmitted from the terminal device to the external server;

(e1) controlling, in response to receiving the first function execution instruction, the image processing unit to execute the image process in accordance with a first setting including the first setting value for the first setting category;

(c2) transmitting, in response to determining in (b) that any of the plurality of users is not permitted to use all of the M1 number of setting values for the first setting category, to the external server a second registration request not including the M1 number of setting values, the external server being configured to store incapability information in association with the specific account information in response to receiving the second registration request from the image processing apparatus, the incapability information indicating that at least one of the M1 number of setting values is not permitted to be specified, the external server being configured to transmit second specification screen data to the terminal device in response to receiving the specific account information from the terminal device, the second specification screen data being generated on the basis of the incapability information so that the second specification screen data represents a second specification screen including the operation specification area and excluding the first setting specification area, wherein excluding the first setting specification area includes excluding the M1 number of setting values for the first setting category such that the M1 number of setting values are not visible on the second specification screen;

(d2) receiving a second function execution instruction from the external server, the second function execution instruction including second information being related to none of the M1 number of setting values being specified for the first setting category, the second function execution instruction further including the specific account information, the terminal device being configured to transmit to the external server a second function execution request not including the M1 number of setting values for the first setting category in response to receiving the instruction operation while displaying the second specification screen, the second function execution instruction being received after the second function execution request is transmitted from the terminal device to the external server;

(f) acquiring, in response to receiving the second function execution instruction, from the memory specific setting specification information associated with the specific account information included in the second function execution instruction, the specific setting specification information being the setting specification information corresponding to the specific user and specifying at least one setting value for the first setting category;

(g) controlling the display to display a selection screen including a first setting selection area for receiving a first selecting operation to select one of the at least one setting value for the first setting category, and (e2) controlling, in response to receiving the second function execution instruction, and in response to receiving the first selecting operation to select a second setting value for the first setting category while the selection screen is displayed on the display, the image processing unit to execute the image process in accordance with a second setting including the second setting value for the first setting category.

* * * * *